US010956464B2

(12) United States Patent
Zou et al.

(10) Patent No.: US 10,956,464 B2
(45) Date of Patent: *Mar. 23, 2021

(54) NATURAL LANGUAGE QUESTION ANSWERING METHOD AND APPARATUS

(71) Applicants: Peking University, Beijing (CN); TENCENT TECHNOLOGY (SHENZHEN) COMPANY LIMITED, Shenzhen (CN)

(72) Inventors: Lei Zou, Shenzhen (CN); Tingting Liu, Shenzhen (CN); Yanxiong Lu, Shenzhen (CN); Huaijun Liu, Shenzhen (CN); Ruizhe Huang, Shenzhen (CN)

(73) Assignees: PEKING UNIVERSITY, Beijing (CN); TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 211 days.

This patent is subject to a terminal disclaimer.

(21) Appl. No.: 16/231,736

(22) Filed: Dec. 24, 2018

(65) Prior Publication Data

US 2019/0146985 A1 May 16, 2019

Related U.S. Application Data

(63) Continuation of application No. 15/109,698, filed as application No. PCT/CN2015/073884 on Mar. 9, 2015, now Pat. No. 10,210,245.

(30) Foreign Application Priority Data

Mar. 10, 2014 (CN) .......................... 201410085902.X

(51) Int. Cl.
*G06F 16/33* (2019.01)
*G06F 16/36* (2019.01)
(Continued)

(52) U.S. Cl.
CPC ........ *G06F 16/3334* (2019.01); *G06F 16/322* (2019.01); *G06F 16/36* (2019.01); *G06F 40/242* (2020.01)

(58) Field of Classification Search
None
See application file for complete search history.

(56) References Cited

U.S. PATENT DOCUMENTS 8,429,179 B1 * 4/2013 Mirhaji .............. G06F 16/2465
707/756
9,342,556 B2 * 5/2016 Bhatia .............. G06F 16/24522
(Continued)

FOREIGN PATENT DOCUMENTS

CN 102262634 A 11/2011
CN 102722542 A 10/2012
(Continued)

OTHER PUBLICATIONS

André Freitas et al., Querying linked data graphs using semantic relatedness: A vocabulary independent approach, Aug. 14, 2013, Data & Knowledge Engineering (journal homepage www.elsevier.com/locate/datak), pp. 126-141 (Year: 2013).*
(Continued)

*Primary Examiner* — Mark D Featherstone
*Assistant Examiner* — Navneet Gmahl
(74) *Attorney, Agent, or Firm* — Anova Law Group, PLLC

(57) ABSTRACT

Natural language question answering method and apparatus in the field of information retrieval and processing are provided. The method includes: acquiring a natural language question N; converting the natural language question N into a query semantic graph $Q^s$, each edge in the query semantic graph $Q^s$ representing one semantic relation in the natural language question N; searching an RDF graph G for a
(Continued)

subgraph matching the query semantic graph $Q^s$; and obtaining an answer to the natural language question N according to the subgraph.

20 Claims, 8 Drawing Sheets

(51) Int. Cl.
   *G06F 16/31* (2019.01)
   *G06F 40/242* (2020.01)

(56) References Cited

U.S. PATENT DOCUMENTS

| | | | |
|---|---|---|---|
| 2009/0012778 | A1 | 1/2009 | Feng et al. |
| 2011/0078166 | A1* | 3/2011 | Oliver ............... G06F 16/951 707/760 |
| 2011/0235799 | A1* | 9/2011 | Sovio ............... H04L 9/3073 380/30 |
| 2011/0238985 | A1* | 9/2011 | Sovio ............... H04N 21/25816 713/168 |
| 2011/0289520 | A1* | 11/2011 | Grigoriev ............ G06F 16/367 719/331 |
| 2011/0320187 | A1 | 12/2011 | Motik et al. |
| 2013/0246049 | A1* | 9/2013 | Mirhaji ............... G06F 16/367 704/9 |
| 2013/0332490 | A1* | 12/2013 | Hu ............... G06F 16/9024 707/798 |
| 2014/0059030 | A1* | 2/2014 | Hakkani-Tur ...... G06F 16/3332 707/706 |
| 2015/0237021 | A1* | 8/2015 | Sovio ............... G06F 16/951 713/168 |
| 2017/0124158 | A1* | 5/2017 | Mirhaji ............... G06F 40/211 |
| 2017/0161363 | A1* | 6/2017 | Cortis ............... G06F 16/334 |
| 2017/0300469 | A1* | 10/2017 | Mirhaji ............... G06F 40/253 |

FOREIGN PATENT DOCUMENTS

| | | |
|---|---|---|
| CN | 101339551 B | 1/2013 |
| CN | 102262634 B | 5/2013 |

OTHER PUBLICATIONS

Intellectual Property India Examination Report for 201647017902 dated Mar. 3, 2020 6 Pages.
Andre Freitas et al., "Querying Linked Data Using Semantic Relatedness: A Vocabulary Independent Approach", R. Munoz et al. (Eds.): NLDB 2011, LNCS 6716, pp. 40-51, 2011, Springer-Verlag Berlin Heidelberg 2011 12 Pages.
Zou Lei. "Natural language question answering over RDF—a graph data driven approach", Proceedings of the 2014 ACM SIGMOD international conference on management of data, Jun. 27, 2014. Page 313-324 12 Pages.
The State Intellectual Property Office of the People's Republic of China (SIPO) Office Action 1 for 201410085902.X dated Oct, 9, 2018 7 pages. (including translation).
European Patent Office (EPO) European search report for 15761024.7 dated Mar. 17, 2017 8 pages.
European Patent Office (EPO) European search report for 15761024. 7, dated Feb. 7, 2018 8 pages.
Freitas Andre et al, "Querying Linked Data Using Semantic Relatedness: A Vocabulary Independent Approach", Data & Knowledge Engineering, vol. 88, Aug. 14, 2013, pp. 126-141.
Bettina Faiiinga et al, "Semantic Web search based on ontological conjunctive queries", Web Semantics: Science, Services and Agents on the World Wide Web, vol. 9, No. 4, Sep. 14, 2011, pp. 453-473.
Schoefegger Karin et al, "A survey socio-semantic information retrieval", Computer Science Review, Elsevier, Amsterdam, NL, vol. 8, Apr. 30, 2013, pp. 25-46.
Marie-Catherine de Marneffe et al, "Generating Typed Dependency Parses from Phrase Structure Parses", 'Proceedings of LREC 2006, Jun. 1, 2006 6 pages.
The World Intellectual Property Organization (WIPO) International Search Report for PCT/CN2015/073884 dated Apr. 28, 2015.
Xu, Kun et al.: "Automatic Understanding of Natural Language Questions for Querying Chinese Knowledge Bases", ACTA Scientiarum Naturalium Universitatis Pekinensis, vol. 50, No. 1, Jan. 31, 2014 (Jan. 31, 2014), pp. 85-92.

* cited by examiner

NATURAL LANGUAGE QUESTION ANSWERING METHOD AND APPARATUS

CROSS-REFERENCE TO RELATED APPLICATIONS

This application is a continuation application of U.S. patent application Ser. No. 15/109,698, filed on Jul. 5, 2016. U.S. patent application Ser. No. 15/109,698 is a national stage of PCT Application No. PCT/CN2015/073884, filed on Mar. 9, 2015, which claims priority to a Chinese patent application No. 201410085902.X, filed on Mar. 10, 2014, the content of all of which is incorporated herein by reference in their entirety.

FIELD OF THE TECHNOLOGY

Embodiments of the present invention generally relate to the field of information retrieval and processing, and in particular, relates to a natural language question answering method and apparatus.

BACKGROUND OF THE DISCLOSURE

A question answering system is an advanced form of an information retrieval system. Such system can answer, by using a natural language accurately and briefly, questions that users ask using the natural language.

A Resource Description Framework (RDF) repository is a basis for implementing the question answering system. The RDF repository, also referred to as a knowledge base, generally includes a large quantity of triples convenient for a computer to recognize and understand. Each triplet is expressed in the form of a subject, a predicate, and an object, for example, a subject may be "<An Actor's self-discipline and improvement>", a predicate may be "category", and an object may be "book". A current question answering system mainly includes two phases: a question understanding phase and a query executing phase. In the question understanding phase, the question answering system first translates a natural language question N into an SPARQLs query sentence, where the SPARQLs is a language for executing query in the RDF repository; and then, in the query executing phase, the question answering system inputs the SPARQLs query sentence to an SPARQLs search engine to find an answer to the natural language question N in the RDF repository.

SUMMARY

Accordingly, embodiments of the present invention provide a natural language question answering method and apparatus.

A natural language question answering method, including:

acquiring a natural language question N;

converting the natural language question N into a query semantic graph $Q^s$, each edge in the query semantic graph $Q^s$ representing one semantic relation in the natural language question N;

searching an RDF graph G for a subgraph matching the query semantic graph $Q^s$; and obtaining an answer to the natural language question N according to the subgraph.

The converting the natural language question N into a query semantic graph $Q^s$ includes:

discovering a relation phrase in the natural language question N;

discovering correlative parameters of each relation phrase; and constructing the query semantic graph $Q^s$, each edge in the query semantic graph $Q^s$ corresponding to one relation phrase, and each vertex in the query semantic graph $Q^s$ corresponding to one correlative parameter.

The discovering a relation phrase in the natural language question N includes:

analyzing the natural language question to obtain a syntax dependence tree Y;

looking up, according to a preset relation phrase dictionary, the relation phrase dictionary for a relation phrase that exists in the syntax dependence tree Y, where, when a relation phrase in the relation phrase dictionary exists in the syntax dependence tree Y, one and only one connected subtree y in the syntax dependence tree Y satisfies the following conditions:

condition 1: each node in the connected subtree y includes one word of the relation phrase, and the connected subtree y includes all words of the relation phrase; and condition 2: it is impossible to find a subtree y' in the syntax dependence tree Y, the subtree y' also satisfying the condition 1 and the connected subtree y being a subtree of the subtree y'.

The discovering correlative parameters of each relation phrase includes:

discovering, in the connected subtree y that is corresponding to each relation phrase and is in the syntax dependence tree Y, correlative parameters of the relation phrase according to a subject-class semantic relation and an object-class semantic relation;

the subject-class semantic relation including: subject, nominal subject, passive nominal subject, clause subject, passive clause subject, control subject, and possessive modifier; and the object-class semantic relation including: object, prepositional object, direct object, and indirect object.

The searching an RDF graph G for a subgraph matching the query semantic graph $Q^s$ includes:

acquiring a candidate list $C_{v_i}$ corresponding to each correlative parameter on the assumption that the query semantic graph $Q^s$ includes n vertices $\{v_1, \ldots, v_n\}$, and each vertex $v_i$ in the query semantic graph $Q^s$ corresponds to one correlative parameter, where $i=1, \ldots, n$;

acquiring a candidate list $C_{v_i v_j}$ corresponding to each relation phrase $rel_{v_i v_j}$, each edge $v_i v_j$ in the query semantic graph $Q^s$ corresponding to one relation phrase $rel_{v_i v_j}$, where $1 \leq i \neq j \leq n$; and searching the RDF graph G for a subgraph matching the query semantic graph $Q^s$ according to the candidate list $C_{v_i}$ and the candidate list $C_{v_i v_j}$.

The acquiring a candidate list $C_{v_i}$ corresponding to each correlative parameter includes:

acquiring the candidate list $C_{v_i}$ corresponding to each correlative parameter $arg_i$ by using an entity linking technology, the candidate list $C_{v_i}$ corresponding to each correlative parameter $arg_i$ including a mapping from the correlative parameter $arg_i$ to at least one candidate entity or candidate class in the RDF graph G, each mapping corresponding to a degree of confidence, and mappings in each candidate list $C_{v_i}$ being sorted according to a descending order of degrees of confidence.

The acquiring a candidate list $C_{v_i v_j}$ corresponding to each relation phrase $rel_{v_i v_j}$ includes:

acquiring the candidate list $C_{v_i v_j}$ corresponding to each relation phrase $rel_{v_i v_j}$ by using a preset paraphrasing dictionary, the candidate list $C_{v_i v_j}$ of each relation phrase $rel_{v_i v_j}$ including a mapping from the relation phrase $rel_{v_iv_j}$ to at least one candidate predicate or candidate predicate path in the RDF graph G, each mapping corresponding to a degree of confidence, and mappings in each candidate list being sorted according to a descending order of degrees of confidence.

The searching the RDF graph G for a subgraph matching the query semantic graph $Q^s$ according to the candidate list $C_{v_i}$ and the candidate list $C_{v_iv_j}$ includes:

searching the RDF graph G for a subgraph that includes vertices $\{u_1, \ldots, u_n\}$ and satisfies a preset condition, the preset condition including the following three conditions:

condition 1: if $v_i$ is mapped to an entity $u_i$ in the RDF graph G, where i=1, . . . , n, $u_i$ should belong to the candidate list $C_{v_i}$;

condition 2: if $v_i$ is mapped to a class $c_i$ in the RDF graph G, where i=1, . . . , n, $u_i$ is an entity whose class is $c_i$, and $c_i$ should belong to the candidate list $C_{v_i}$; and condition 3: for each edge $v_iv_j \square Q^s$, $u_iu_j \square G$ or $u_ju_i \square G$, and a predicate or predicate path $P_{ij}$ corresponding to the edge $v_iv_j$ is mapped to $u_iu_j$ or $u_ju_i$ in the candidate list $C_{v_iv_j}$.

Before the acquiring a candidate list $C_{v_iv_j}$ of each relation phrase $rel_{v_iv_j}$ by using a preset paraphrasing dictionary, the method further includes:

setting a dictionary $T=\{rel_1, \ldots, rel_n\}$, where i=1, . . . , n, and each $rel_i$ is one relation phrase, and mapping the relation phrase $rel_i$ to a predicate or predicate path L in the RDF graph G according to a supported entity set $Sup(rel_i)$ corresponding to each relation phrase $rel_i$;

computing a degree of confidence of the mapping from the relation phrase $rel_i$, to each predicate or predicate path L; searching, according to the degrees of confidence, continuous predicate edges formed in the RDF graph G by top k most possible predicate/predicate paths, the continuous predicate edges having same semantics as the relation phrase $rel_i$; and constructing the paraphrasing dictionary according to the relation phrase $rel_i$ and the continuous predicate edges.

The computing a degree of confidence of the mapping from the relation phrase $rel_i$ to each predicate or predicate path L includes:

setting, for each relation phrase $rel_i$, that the supported entity set corresponding to the relation phrase $rel_i$ is $Sup(rel_i)$:

$$Sup(rel_i)=\{(v_i^1,v_i'^1), \ldots ,(v_i^m,v_i'^m)\},$$

finding, in the RDF graph G for each entity pair $v_i^j$, $v_i'^j$ in the $Sup(rel_i)$, all simple paths between the entity pair $v_i^j$, $v_i'^j$, the simple paths being expressed as $P(v_i^j, v_i'^j)$, and $$making\ PS(rel_i)=\cup_{j=1,\ldots,m}Path(v_i^j,v_i'^j);$$

computing, for the predicate or predicate path L, a tf value of L in the $PS(rel_i)$ as follows:

$$tf(L,PS(rel_i))=|\{(Path(v_i^j,v_i'^j)|L\in Path(v_i^j,v_i'^j))\}|;$$

computing an idf value of L in the dictionary $T=\{rel_i, \ldots, rel_n\}$ as follows:

$$idf(L, T) = \log\frac{|T|}{|\{rel_i \in T | L \in PS(rel_i)\}| + 1};$$

computing a tf–idf value of L as follows:

$$tf-idf(L,PS(rel_i),T)=tf(L,PS(rel_i))\times idf(L,T);\ and$$

using the tf–idf value as the degree of confidence of the mapping from the relation phrase $rel_i$ to the predicate or predicate path L.

A natural language question answering apparatus, including:

a question acquiring module, configured to acquire a natural language question N;

a question converting module, configured to convert the natural language question N into a query semantic graph $Q^s$, each edge in the query semantic graph $Q^s$ representing one semantic relation in the natural language question N;

a subgraph matching module, configured to search an RDF graph G for a subgraph matching the query semantic graph $Q^s$; and an answer generating module, configured to obtain an answer to the natural language question N according to the subgraph.

The question converting module includes:

a phrase discovering unit, a parameter discovering unit, and a semantic graph constructing unit, the phrase discovering unit being configured to discover a relation phrase in the natural language question N;

the parameter discovering unit being configured to discover correlative parameters of each relation phrase; and the semantic graph constructing unit being configured to construct the query semantic graph $Q^s$, each edge in the query semantic graph $Q^s$ corresponding to one relation phrase, and each vertex in the query semantic graph $Q^s$ corresponding to one correlative parameter.

The phrase discovering unit includes:

a syntax analyzing sub-unit, configured to analyze the natural language question to obtain a syntax dependence tree Y; and a phrase query sub-unit, configured to look up, according to a preset relation phrase dictionary, the relation phrase dictionary for a relation phrase that exists in the syntax dependence tree Y, where, when a relation phrase in the relation phrase dictionary exists in the syntax dependence tree Y, one and only one connected subtree y in the syntax dependence tree Y satisfies the following conditions:

condition 1: each node in the connected subtree y includes one word of the relation phrase, and the connected subtree y includes all words of the relation phrase; and condition 2: it is impossible to find a subtree y' in the syntax dependence tree Y, the subtree y' also satisfying the condition 1 and the connected subtree y being a subtree of the subtree y'.

The parameter discovering unit is configured to discover, in the connected subtree y that is corresponding to each relation phrase and is in the syntax dependence tree Y, correlative parameters of the relation phrase according to a subject-class semantic relation and an object-class semantic relation;

the subject-class semantic relation including: subject, nominal subject, passive nominal subject, clause subject, passive clause subject, control subject, and possessive modifier;

and the object-class semantic relation including: object, prepositional object, direct object, and indirect object.

The subgraph matching module includes:

a first list acquiring unit, configured acquire a candidate list $C_{v_i}$ corresponding to each correlative parameter on the assumption that the query semantic graph $Q^s$ includes n vertices $\{v_1, \ldots, v_n\}$, and each vertex $v_i$ in the query semantic graph $Q^s$ corresponds to one correlative parameter, where i=1, . . . , n;

a second list acquiring unit, configured to acquire a candidate list $C_{v_iv_j}$ corresponding to each relation phrase $rel_{v_iv_j}$, each edge $v_iv_j$ in the query semantic graph $Q^s$ corresponding to one relation phrase $rel_{v_iv_j}$, where $1<i\neq j<n$; and a subgraph matching unit, configured to search the RDF graph G for a subgraph matching the query semantic graph $Q^s$ according to the candidate list $C_{v_i}$ and the candidate list $C_{v_iv_j}$.

The first list acquiring unit is configured to acquire the candidate list $C_{v_i}$ corresponding to each correlative parameter $arg_i$ by using an entity linking technology, the candidate list $C_{v_i}$ corresponding to each correlative parameter $arg_i$ including a mapping from the correlative parameter $arg_i$ to at least one candidate entity or candidate class in the RDF graph G, each mapping corresponding to a degree of confidence, and mappings in each candidate list $C_{v_i}$ being sorted according to a descending order of degrees of confidence.

The second list acquiring unit is configured to acquire the candidate list $C_{v_iv_j}$ corresponding to each relation phrase $rel_{v_iv_j}$ by using a preset paraphrasing dictionary, the candidate list $C_{v_iv_j}$ of each relation phrase $rel_{v_iv_j}$ including a mapping from the relation phrase $rel_{v_iv_j}$ to at least one candidate predicate or candidate predicate path in the RDF graph G, each mapping corresponding to a degree of confidence, and mappings in each candidate list $C_{v_iv_j}$ being sorted according to a descending order of degrees of confidence.

The subgraph matching unit is configured to search the RDF graph G for a subgraph that includes vertices $\{u_1, \ldots, u_n\}$ and satisfies a preset condition, the preset condition including the following three conditions:

condition 1: if $v_i$ is mapped to an entity $u_i$ in the RDF graph G, where $i=1, \ldots, n$, $u_i$ should belong to the candidate list $C_{v_i}$;

condition 2: if $v_i$ is mapped to a class $c_i$ in the RDF graph G, where $i=1, \ldots, n$, $u_i$ is an entity whose class is $c_i$, and $c_i$ should belong to the candidate list $C_{v_i}$; and condition 3: for each edge $v_iv_j \square Q^s$, $u_iu_j \square G$ or $u_ju_i \square G$, and a predicate or predicate path $P_{ij}$ corresponding to the edge $v_iv_j$ is mapped to $u_iu_j$ or $u_ju_i$ in the candidate list $C_{v_iv_j}$.

The apparatus further includes:

a path mapping module, configured to set a dictionary $T=\{rel_1, \ldots, rel_n\}$, where $i=1, \ldots, n$, and each $rel_i$ is one relation phrase, and map the relation phrase $rel_i$ to a predicate or predicate path L in the RDF graph G according to a supported entity set $Sup(rel_i)$ corresponding to each relation phrase $rel_i$;

a degree of confidence computing module, configured to compute a degree of confidence of the mapping from the relation phrase $rel_i$ to each predicate or predicate path L;

a path searching module, configured to search, according to the degrees of confidence, continuous predicate edges formed in the RDF graph G by top k most possible predicate/predicate paths, the continuous predicate edges having same semantics as the relation phrase $rel_i$; and a dictionary constructing module, configured to construct the paraphrasing dictionary according to the relation phrase $rel_i$ and the continuous predicate edges.

The degree of confidence computing module includes:

a path searching unit, configured to set, for each relation phrase $rel_i$, that the supported entity set corresponding to the relation phrase $rel_i$ is $Sup(rel_i)$:

$$Sup(rel_i)=\{(v_i^1,v_i^{'1}), \ldots ,(v_i^m,v_i^{'m})\}$$

find, in the RDF graph G for each entity pair $v_i^j$, $v_i^{'j}$ in the $Sup(rel_i)$, all simple paths between the entity pair $v_i^j$, $v_i^{'j}$, the simple paths being expressed as $P(v_i^j, v_i^{'j})$, and $$\text{make } PS(rel_i)=\cup_{j=1,\ldots,m}Path(v_i^j,v_i^{'j});$$

a tf value computing unit, configured to compute, for the predicate or predicate path L, a tf value of L in the $P(rel_i)$ as follows:

$$tf(L,PS(rel_i))=|\{(Path(v_i^j,v_i^{'j})|L \in Path(v_i^1,v_i^{'1}))\}|;$$

an idf value computing unit, configured to compute an idf value of L in the dictionary $T=\{rel_1, \ldots, rel_n\}$ as follows:

$$idf(L, T) = \log\frac{|T|}{|\{rel_i \in T \mid L \in PS(rel_i)\}| + 1};$$

and a Tf–idf value computing unit, configured to compute a tf–idf value of L as follows:

$$tf\text{-}idf(L,PS(rel_i),T)=tf(L,PS(rel_i))\times idf(L,T); \text{ and}$$

use the tf–idf value as the degree of confidence of the mapping from the relation phrase $rel_i$ to the predicate or predicate path L.

By converting a natural language question N into a query semantic graph $Q^s$, searching an RDF graph G for a subgraph matching the query semantic graph $Q^s$, and obtaining an answer to the natural language question N according to the subgraph, the present disclosure solves a problem of consumption of a large computation amount for disambiguation in an understanding stage/phase, and achieves an effect of providing a brand new natural language question answering mechanism in which disambiguation is not needed when the natural language question N is converted into the query semantic graph $Q^s$, and a disambiguation process is completed naturally in a process of searching for the subgraph matching the query semantic graph $Q^s$.

BRIEF DESCRIPTION OF THE DRAWINGS

To illustrate the technical solutions in the embodiments of the present invention more clearly, the following briefly introduces the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the objectives, the technical solutions, and advantages of the present disclosure clearer, the implementation manners of the present disclosure will be described in more detail below with reference to the accompanying drawings.

Figure 1:
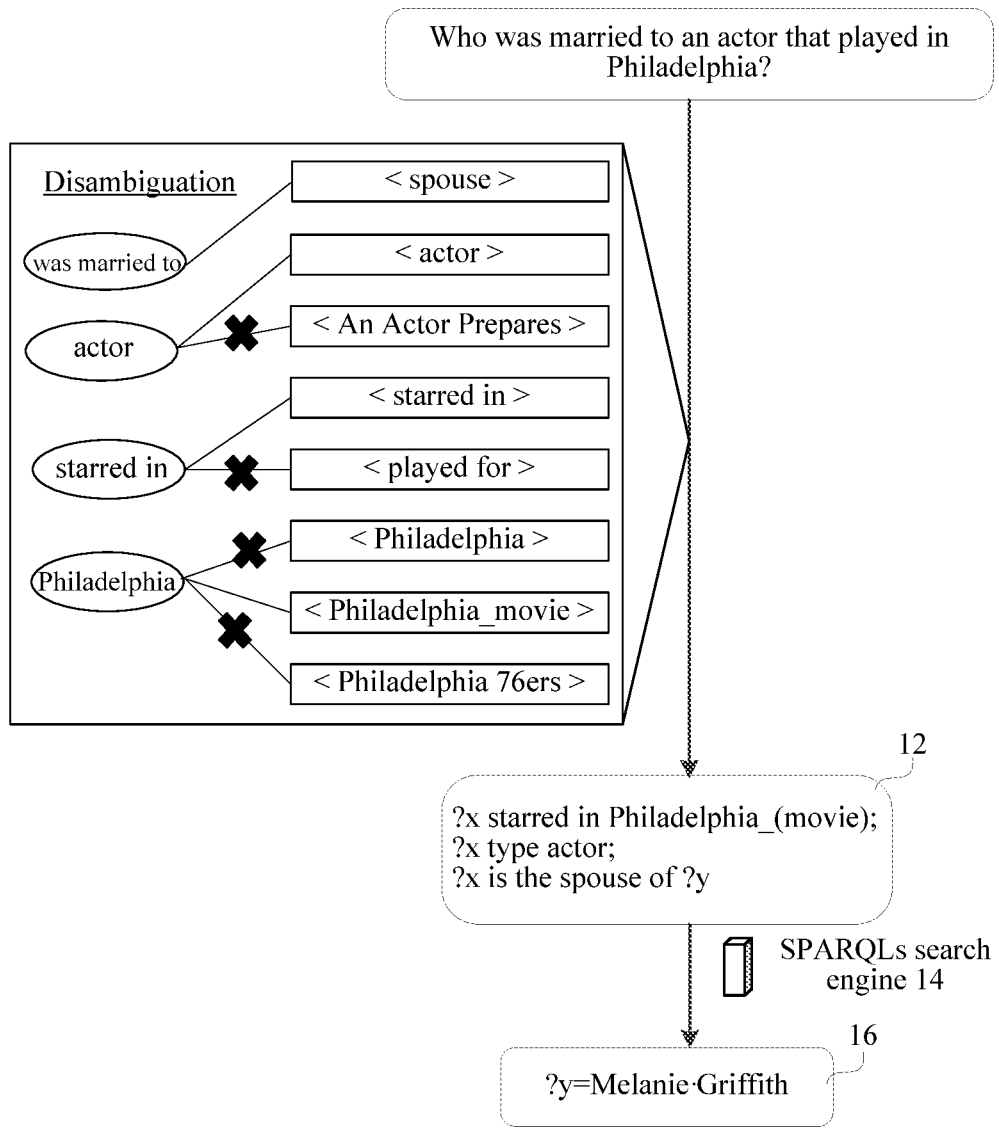
FIG. 1 is a method flowchart of a natural language question answering method provided in the existing technology.

As shown in FIG. 1, after a natural language question "who was married to an actor that played in Philadelphia?" is input to a question answering system, the question answering system first translates the natural language question into an SPARQLs query sentence 12:

"?x starred in Philadelphia_(movie);
?x type actor;
?x spouse ?y",

Then, an SPARQLs search engine 14 outputs a query result 16: "?y=Melanie Griffith".

In the process of implementing natural language question answering, at least the following problems are found: due to the ambiguity of the natural language, for example, "Philadelphia" may refer to Philadelphia (city), Philadelphia (movie), and Philadelphia 76ers, in the process of translating the natural language question N into the SPARQLs query sentence 12, the foregoing technology needs to eliminate ambiguity according to the meaning of the natural language question N. However, to eliminate ambiguity is not a simple task, which not only needs to consume a large amount of computation, but also disturb the accuracy of the result if disambiguation fails.

Figure 2A:
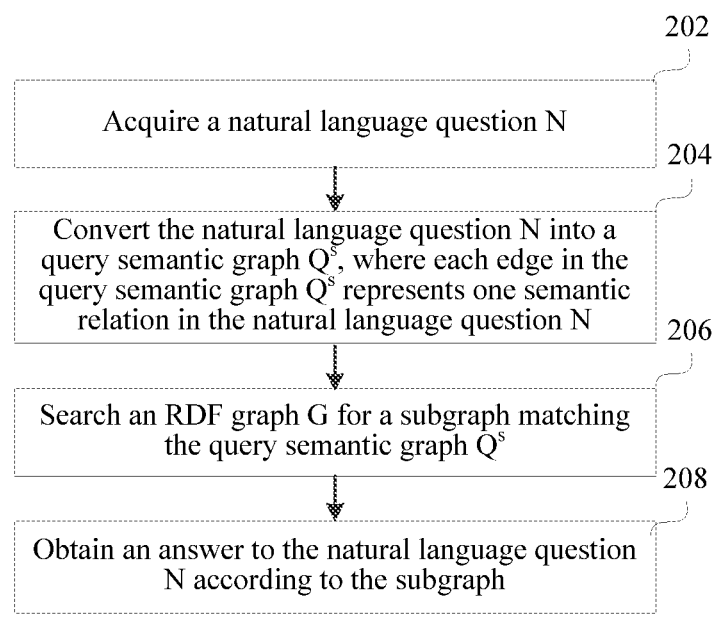
FIG. 2A is a method flowchart of a natural language question answering method according to an embodiment of the present invention.

Embodiments of the present invention provide a brand new natural language question answering mechanism. Different from the existing technology that uses an SPARQLs query sentence and an SPARQLs search engine to acquire an answer to a natural language question N, the embodiments of the present invention use a query semantic graph $Q^s$ and an RDF graph G to acquire an answer to a natural language question N, which is specifically described as follows:

Referring to FIG. 2A, FIG. 2A shows a method flowchart of a natural language question answering method according to an embodiment of the present invention. The natural language question answering method is applied to a server, and the method includes:

Step 202: Acquire a natural language question N.

The natural language question N is a question that a user asks a question answering system by using a natural language.

For example, the natural language question N is "who was married to an actor that played in Philadelphia?".

Step 204: Convert the natural language question N into a query semantic graph $Q^s$, where each edge in the query semantic graph $Q^s$ represents one semantic relation in the natural language question N.

The natural language question N includes at least one semantic relation, and the query semantic graph $Q^s$ is used for equivalently representing the semantic relation in the natural language question N. One semantic relation is one triplet $<rel_i, arg_1, arg_2>$, where $rel_i$ is a relation phrase, and $arg_1$ and $arg_2$ are two correlative parameters of the relation phrase. One semantic relation represents a relation between two entities, or an attribute value of one entity.

Each edge in the query semantic graph $Q^s$ represents one semantic relation in the natural language question N. Each edge in the query semantic graph $Q^s$ corresponds to the relation phrase in one semantic relation, and two vertices on each edge each corresponding to one correlative parameter.

Figure 2B:
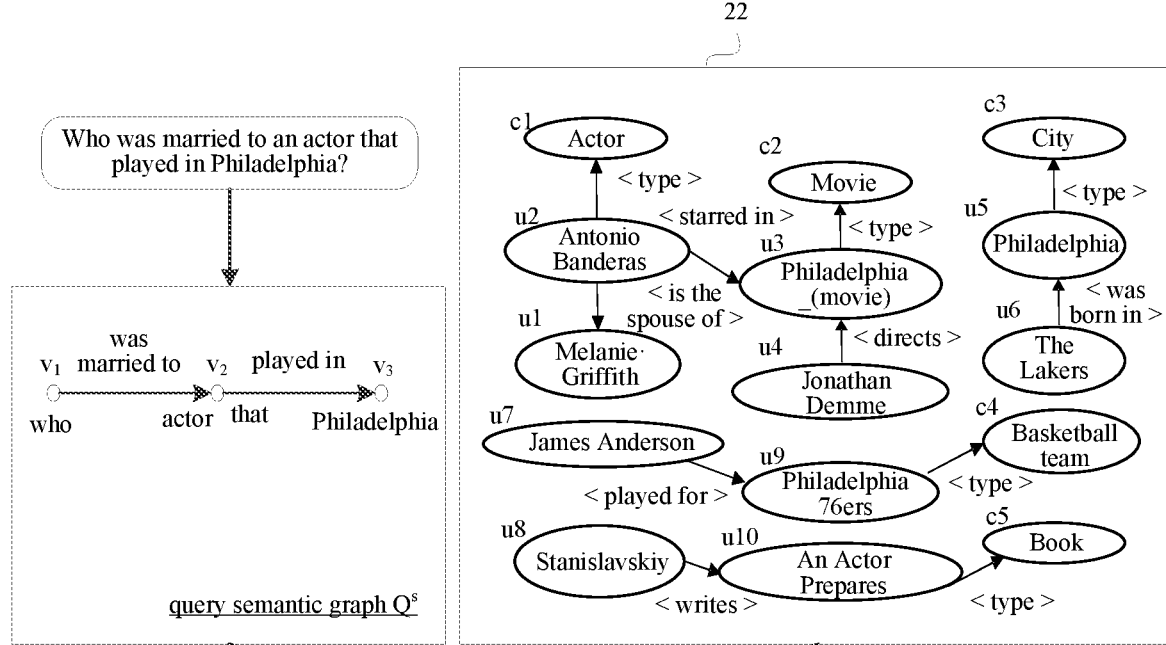
FIG. 2B is a schematic diagram of implementation of the embodiment shown in FIG. 2A in an actual application.
Figure 2B:
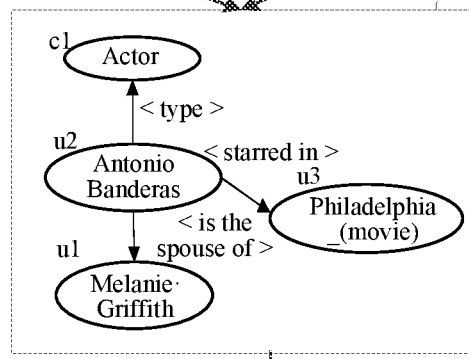

With reference to FIG. 2B, a query semantic graph $Q^s$ obtained by converting the natural language question N "who was married to an actor that played in Philadelphia?" includes two edges: a semantic relation represented by a first edge $v_1v_2$ is <was married to, who, actor>, where "was married to" is a relation phrase, and "who" and "actor" are two correlative parameters of the relation phrase "was married to"; a semantic relation represented by a second edge $v_2v_3$ is <played in, that, Philadelphia>, where "played in" is a relation phrase, and "that" and "Philadelphia" are two correlative parameters of the relation phrase "played in". Because "actor" and "that" refer to the same entity, they share a vertex. This is the "anaphora resolution" that has been intensively studied so far, and is no longer described in detail.

Step 206: Search an RDF graph G for a subgraph matching the query semantic graph $Q^s$.

The RDF graph G is an RDF repository expressed in the form of a graph.

For example, in FIG. 2B, it is assumed that the given RDF graph G includes triplets related to "Philadelphia", "Philadelphia (movie)", "Philadelphia 76ers", "actor", and the like, as shown in block 22. Then, by using a subgraph matching technology, the server searches the RDF graph G for a subgraph matching the query semantic graph $Q^s$, as shown in block 24.

Step 208: Obtain an answer to the natural language question N according to the subgraph.

Because the subgraph matches the query semantic graph $Q^s$, the subgraph includes the answer to the natural language question N.

For example, according to a node $u_1$ "Melanie. Griffith" which is in the subgraph 24 and corresponds to an interrogative "who" in the query semantic graph $Q^s$, an answer 26 to the natural language question N is obtained.

As such, by converting a natural language question N into a query semantic graph $Q^s$, searching an RDF graph G for a subgraph matching the query semantic graph $Q^s$, and obtaining an answer to the natural language question N according to the subgraph, the natural language question answering method provided by this embodiment solves a problem of consumption of a large amount of computation for disambiguation in an understanding stage, and achieves an effect of providing a brand new natural language question answering mechanism in which disambiguation is not needed when the natural language question N is converted into the query semantic graph $Q^s$, and a disambiguation process is completed naturally in a process of searching for the subgraph matching the query semantic graph $Q^s$.

Figure 3A:
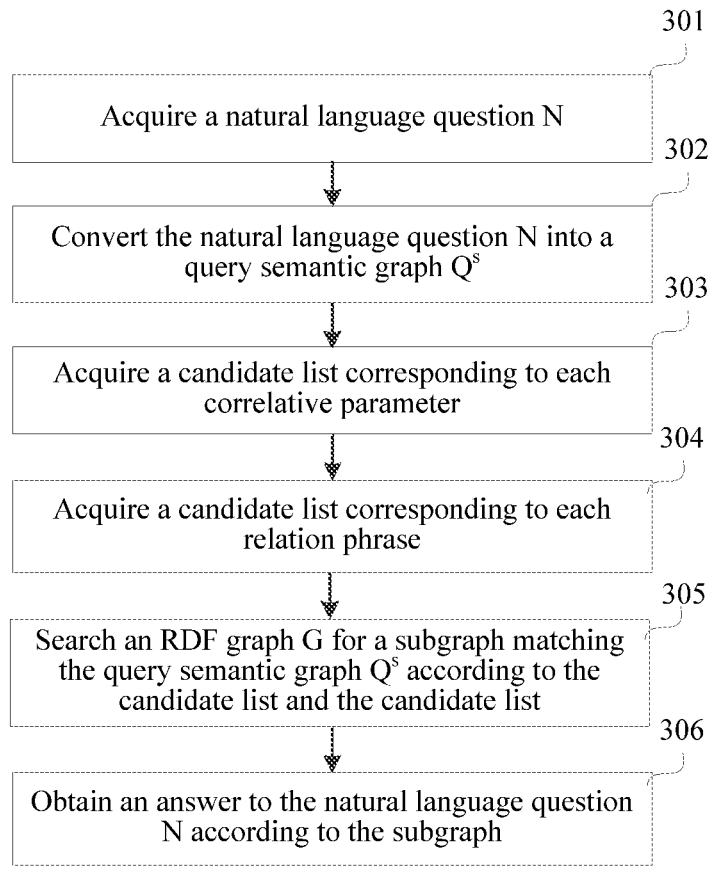
FIG. 3A is a method flowchart of a natural language question answering method according to another embodiment of the present invention.

Referring to FIG. 3A, FIG. 3A shows a method flowchart of a natural language question answering method according to another embodiment of the present invention. The natural language question answering method is applied to a server, and the method includes:

Step 301: Acquire a natural language question N.

The server may directly acquire the natural language question N asked by a user. Alternatively, the server acquires the natural language question that a user asks by using a terminal.

For example: the user inputs an audio-form natural language question N by using a microphone on a mobile phone, and then the mobile phone transmits the audio-form natural language question N to the server through a wired network or a wireless network. The server converts the audio-form natural language question N into a text-form natural language question N by using an audio recognition technology, and finally acquires the natural language question N.

To simplify description, that the natural language question N is "who was married to an actor that played in Philadelphia?" is constantly used as an example for illustration purposes herein. (Note: The question in English "who was married to an actor that played in Philadelphia" was used in actual experiments, and limited by the sentence pattern, some examples herein still use the original English question for discussion purposes.)

Step 302: Convert the natural language question N into a query semantic graph $Q^s$.

The server converts the acquired natural language question N into the query semantic graph $Q^s$ having equivalent semantics. Each edge in the query semantic graph $Q^s$ represents one semantic relation in the natural language question N. Each edge in the query semantic graph $Q^s$ corresponds to the relation phrase in one semantic relation, and two vertices on each edge separately correspond to one correlative parameter of the relation phrase on the edge.

Figure 3B:
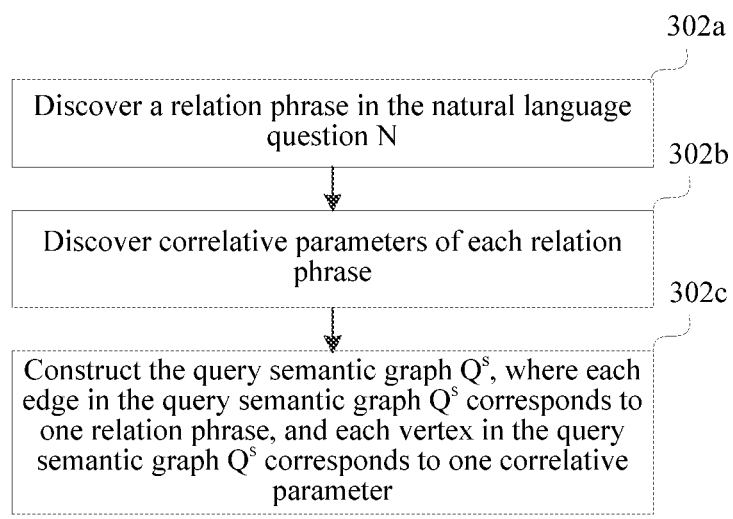
FIG. 3B to FIG. 3E are schematic diagrams of implementation of the embodiment shown in FIG. 3A in an actual application.

This step may include the following sub-steps, as shown in FIG. 3B:

302a: Discover a relation phrase in the natural language question N.

302b: Discover correlative parameters of each relation phrase.

302c: Construct the query semantic graph $Q^s$, where each edge in the query semantic graph $Q^s$ corresponds to one relation phrase, and each vertex in the query semantic graph $Q^s$ corresponds to one correlative parameter.

In sub-step 302a, the server first analyzes the natural language question N to obtain a syntax dependence tree Y, and then the server looks up, according to a preset relation phrase dictionary, the relation phrase dictionary for a relation phrase that exists in the syntax dependence tree Y. The server may obtain the syntax dependence tree Y of the natural language question N by using a syntax parser provided by Stanford University.

When a relation phrase in the relation phrase dictionary exists in the syntax dependence tree Y, one and only one connected subtree y in the syntax dependence tree Y satisfies the following conditions:

condition 1: each node in the connected subtree y includes one word of the relation phrase, and the connected subtree y includes all words of the relation phrase; and condition 2: it is impossible to find a subtree y' in the syntax dependence tree Y, the subtree y' also satisfying the condition 1 and the connected subtree y being a subtree of the subtree y'.

In other words, the task of sub-step 302a is to give a syntax dependence tree Y of the natural language question N and a relation phrase dictionary T={$rel_1$, . . . , $rel_n$}, and the objective of the server is to look up the relation phrase dictionary T to find a relation phrase that exists in the syntax dependence tree Y.

The basic idea of an algorithm for implementing the task of sub-step 302a is as follows:

For each node $w_i$ in Y, find a candidate mode list $PL_i$, and then detect, in the $PL_i$, whether there is a subtree rooted at $w_i$ and including words the same as all those in the relation phrase. Specifically speaking, a depth-first search strategy is used to probe each path rooted at $w_i$, and if there is no relation phrase that includes a word w' and all words on the path from the node w' to the node $w_i$ (where w' is a sub-node of $w_i$), stop searching branches at the node w'. Herein, rel[w] is used to represent that a word w' on a subtree rooted at $w_i$ exists in the relation phrase rel.

The specific algorithm is as follows:

```
Input: a syntax dependence tree Y and an inverted index based on
a relation phrase dictionary T;
    Output: all occurrence positions of relation phrases (which belong
to the relation phrase dictionary T) that exist in the syntax dependence
tree Y.
    1:      for each node w_i in Y do
    2:          Find a list of relation phrases PL_i occurring in T by the
                inverted list.
    3:      for each node w_i in Y do
    4:          Set PL = PL_i
    5:          for each relation phrase rel □ PL do
    6:              Set rel[w_i] = 1 // indicating the appearance of
                    word w_i in rel.
    7:      Call Probe(w_i, PL)
    8:      for each relation phrase rel in PL_i do
    9:          if all words w of rel have rel[w_i] = 1 then
    10:             rel is an occurring relation phrase in Y
    11:             Return rel and a subtree rooted at w_i includes
(and only includes) all words in rel.
    Probe(w_i, PL')
    1:      for each child w' of w_i do
    2:          PL" = PL'∩PL_i ;
    3:          if PL" == ∅ , then:
    4:              return
    5:          else
    6:              for each relation phrase rel □ PL" do
    7:                  Set rel[w']=1
    8:                  Call Prode (w', PL")
```

Figure 3C:
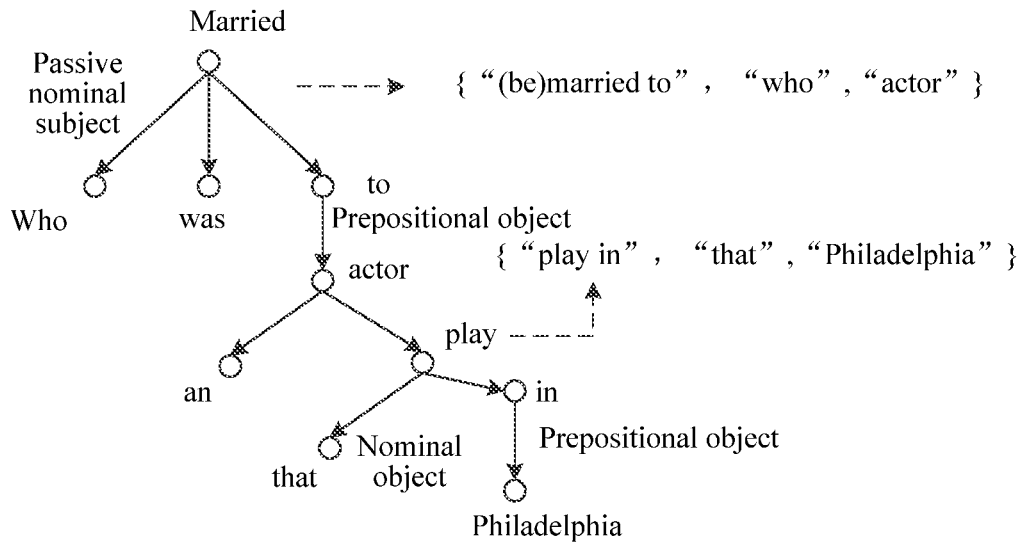

Referring to FIG. 3C, by using the natural language question N "who was married to an actor that played in Philadelphia" as an example, the server may find occurrence positions of the relation phrase "was married to" and the relation phrase "played in" in the syntax dependence tree Y by using the foregoing algorithm. The relation phrase "was married to" corresponds to a connected subtree that is in the syntax dependence tree Y and includes a total of three nodes, namely, the node "was", the node "married", and the node "to"; and the relation phrase "played in" corresponds to a connected subtree that is in the syntax dependence tree Y and includes a total of two nodes, namely, the node "played" and the node "in".

In sub-step 302b, for the connected subtree y that is in the syntax dependence tree Y and corresponds to each relation phrase, correlative parameters of the relation phrase are found in the connected subtree y according to a subject-class semantic relation and an object-class semantic relation.

The subject-class semantic relation includes: subject subj, nominal subject nsubj, passive nominal subject nsubjpass, clause subject csubj, passive clause subject csubjpass, control subject xsubj, and possessive modifier poss.

The object-class semantic relation includes: object obj, prepositional object pobj, direct object dobj, and indirect object iobj.

In other words, after finding a connected subtree y of one relation phrase rel, the server checks whether there is a subject-class relation between each node w in the connected subtree y and sub-nodes of each node w, to identify the correlative parameter $arg_i$. Similarly, the correlative parameter $arg_2$ may be identified by using an object-class relation. If one correlative parameter has more than one candidate, the server selects a candidate which is closest to the relation phrase rel as the correlative parameter.

For example, in FIG. 3C, for the relation phrase "was married to", the correlative parameter "who" is identified among the sub-nodes of the node "married" according to the subject-class semantic relation, and the correlative parameter "actor" is identified among the sub-nodes of the node "to" according to the object-class semantic relation. In the same manner, for the relation phrase "played in", the correlative parameter "that" is identified among the sub-nodes of the node "played" according to the subject-class semantic relation, and the correlative parameter "Philadelphia" is identified among the sub-nodes of the node "in" according to the object-class semantic relation.

In addition, if the server does not identify the correlative parameters $arg_1$ and $arg_2$ of a relation phrase according to the subject-class relation and object-class relation, the server further identifies the correlative parameters by using the following heuristic rules:

Rule 1: Extend an occurrence position t of the relation phrase by using some frequently used words such as prepositions and auxiliary words, and identify a subject-class relation or an object-class relation by using newly added tree nodes.

Rule 2: If a parent node, which is in Y, of a root node oft has a subject-class relation or an object-class relation, add the root node as $arg_1$.

Rule 3: If a parent node of a root node oft has a subject-class relation with a child node of t, add the child node as $arg_1$.

Rule 4: If one of $arg_1$ and $arg_2$ is empty, add the closest interrogative or the first nominal phrase in t as $arg_1$ or $arg_2$.

If correlative parameters $arg_1$ and $arg_2$ still cannot be found, the server further discards the relation phrase.

In sub-step 302c, the server constructs a query semantic graph $Q^s$ according to the relation phrases identified from the natural language question N and the correlative parameters corresponding to each relation phrase, where each edge in the query semantic graph $Q^s$ corresponds to one relation phrase, and each vertex in the query semantic graph $Q^s$ corresponds to one correlative parameter.

If two correlative parameters refer to a same entity, the two correlative parameters share a vertex in the query semantic graph $Q^s$.

So far, the server completes the conversion of the natural language question N into the query semantic graph $Q^s$. Then, the server needs to find out, in the RDF graph G, candidates of each vertex and each edge in the query semantic graph $Q^s$, which is as follows:

Step 303: Acquire a candidate list $C_{v_i}$ corresponding to each correlative parameter.

Assuming that the query semantic graph $Q^s$ includes n vertices $\{v_1, \ldots, v_n\}$, and each vertex $v_i$ in the query semantic graph $Q^s$ corresponds to one correlative parameter, where $i=1, \ldots, n$, the server acquires the candidate list $C_{v_i}$ corresponding to each correlative parameter.

Specifically, the server acquires the candidate list $C_{v_i}$ corresponding to each correlative parameter $arg_i$ by using an entity linking technology, where the candidate list $C_{v_i}$ of each correlative parameter $arg_i$ includes a mapping from the correlative parameter $arg_i$ to at least one candidate entity or candidate class in the RDF graph G, each mapping corresponds to a degree of confidence, and mappings in each candidate list $C_{v_i}$ are sorted according to a descending order of degrees of confidence.

Figure 3D:
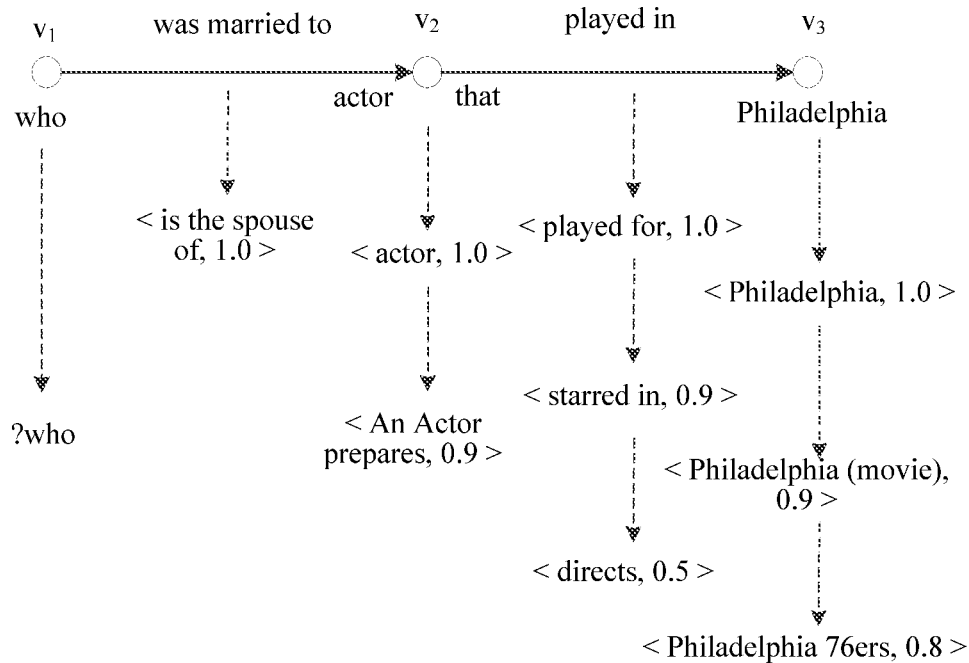

For example, with reference to FIG. 3D, the query semantic graph $Q^s$ corresponding to the natural language question N "who was married to an actor that played in Philadelphia?" includes three vertices: a vertex $v_1$, a vertex $v_2$, and a vertex $v_3$.

The correlative parameter corresponding to the vertex $v_1$ is the interrogative "who", and the server uses all entities in the RDF graph as a candidate list of the vertex $v_1$.

The correlative parameter corresponding to the vertex $v_2$ is "actor", and the server uses an entity "actor", an entity "An Actor Prepares", and an entity "Antonio Banderas" in the RDF graph as a candidate list of the vertex $v_2$, and sorts the entities according to degrees of confidence. "Antonio Banderas" is classified as "actor".

The correlative parameter corresponding to the vertex $v_3$ is "Philadelphia", and the server uses an entity "Philadelphia", an entity "Philadelphia (movie)", and an entity "Philadelphia 76ers" in the RDF graph as a candidate list of the vertex $v_3$, and sorts the entities according to degrees of confidence. The entity "Philadelphia 76ers" is a name of a basketball team.

Step 304: Acquire a candidate list $C_{v_iv_j}$ corresponding to each relation phrase $rel_{v_iv_j}$.

Each edge in the query semantic graph $Q^s$ corresponds to one relation phrase $rel_{v_iv_j}$, where $1 \le i \ne j \le n$, and the server acquires a candidate list $C_{v_iv_j}$ corresponding to each relation phrase $rel_{v_iv_j}$.

Specifically, the server may first construct a paraphrasing dictionary, where the paraphrasing dictionary includes a mapping from the relation phrase to at least one candidate predicate or candidate predicate path in the RDF graph G, and each mapping has a degree of confidence.

Then, the server acquires the candidate list $C_{v_iv_j}$ of each relation phrase $rel_{v_iv_j}$ in the query semantic graph $Q^s$ by using the paraphrasing dictionary, where the candidate list $C_{v_iv_j}$ of each relation phrase includes a mapping from the relation phrase $rel_{v_iv_j}$ to at least one candidate predicate or candidate predicate path in the RDF graph G, each mapping corresponds to a degree of confidence, and mappings in the candidate list $C_{v_iv_j}$ are sorted according to a descending order of degrees of confidence.

For example, with reference to FIG. 3D, the query semantic graph $Q^s$ corresponding to the natural language question N "who was married to an actor that played in Philadelphia?" includes two edges: an edge $v_1v_2$ and an edge $v_2v_3$.

The relation phrase corresponding to the edge $v_1v_2$ is "was married to", and the server uses a predicate "is the spouse of" in the RDF graph as a candidate list of the edge $v_1v_2$.

The relation phrase corresponding to the edge $v_2v_3$ is "played in", and the server uses a predicate "played for" (note: the word play in English means both being a part of a team and representing a character in a movie), a predicate "starred in" and a predicate "directs" in the RDF graph as a candidate list of the edge $v_2v_3$.

It should be noted that, in step 303 and step 304, the server does not perform disambiguation, which is different from the existing technology. For example, although the entity "Philadelphia 76ers" is apparently irrelevant to the natural language question N, the server currently does not process this ambiguity.

Step 305: Search an RDF graph G for a subgraph matching the query semantic graph $Q^s$ according to the candidate list $C_{v_i}$ and the candidate list $C_{v_iv_j}$.

The server searches the RDF graph G for a subgraph that includes vertices $\{u_1, \ldots, u_n\}$ and satisfies a preset condition, where the preset condition includes the following three conditions:

Condition 1: if $v_i$ is mapped to an entity $u_i$ in the RDF graph G, where $i=1, \ldots, n$, $u_i$ should belong to the candidate list $C_{v_i}$.

Condition 2: if $v_i$ is mapped to a class $c_i$ in the RDF graph G, where $i=1, \ldots, n$, $u_i$ is an entity whose class is $c_i$, and $c_i$ should belong to the candidate list $C_{v_i}$; and Condition 3: for each edge $v_iv_j \in Q^s$, $u_iu_j \in G$ or $u_ju_i \in G$, and a predicate or predicate path $P_{ij}$ corresponding to the edge $v_iv_j$ is mapped to $u_iu_j$ or $u_ju_i$ in the candidate list $C_{v_iv_j}$.

The server may search the RDF graph G for the subgraph matching the query semantic graph $Q^s$ by using a top-k algorithm. The top-k algorithm can be used to find top K most possible matching subgraphs; each matching subgraph has a score, where the score comes from a confidence probability on each edge and each vertex in the matching subgraph. The score is defined as follows:

Assuming that one query semantic graph $Q^s$ has n vertices $\{v_1, \ldots, v_n\}$, and a subgraph, which is in the RDF graph G and includes n vertices $\{u_1, \ldots, u_n\}$, is a subgraph matching $Q^s$, the score is as follows:

$$\text{Score}(M) = \log\left(\prod_{v_i \in V(Q^s)} \delta(\arg_i, u_i) \times \prod_{\overrightarrow{v_i v_j} \in E(Q^s)} \delta\left(\overrightarrow{rel_{v_i v_j}}, P_{ij}\right)\right) =$$

$$\sum_{v_i \in V(Q^s)} \log(\delta(\arg_i, u_i)) + \sum_{\overrightarrow{v_i v_j} \in E(Q^s)} \log\left(\delta\left(\overrightarrow{rel_{v_i v_j}}, P_{ij}\right)\right)$$

where $\arg_i$ is a correlative parameter of the vertex $v_i$, $u_i$ is an entity or a class in the RDF graph G, $$\overrightarrow{rel_{v_i v_j}}$$

is a relation phrase of the edge $v_i v_j$, and $P_{ij}$ is a predicate on the edge $u_i u_j$ or $u_j u_i$.

The server may also optimize a search space of the foregoing top-k algorithm according to the following heuristic method:

The first pruning method is to reduce the number of candidates in each candidate list $C_{v_i}/C_{v_i v_j}$ as far as possible, and if a vertex $u_i$ that belongs to $C_{v_i}$ cannot belong to any subgraph matching the query semantic graph $Q^s$, the server directly filters out the vertex.

The second method is to end the search process as early as possible by using a score threshold of top k matches.

The basic idea is as follows: set a buoy for each candidate list $C_{v_i}/C_{v_i v_j}$. For each vertex $v_i$ in the query semantic graph $Q^s$, set $p_i$ pointing to the candidate list $C_{v_i}$; and for each edge $v_i v_j$ in the query semantic graph $Q^s$, set pointing to the candidate list $C_{v_i v_j}$.

For ease of description, $p_i$ is used to represent a node in the RDF graph G that the cursor $p_i$ points to. At the beginning, all cursors point to the head of the candidate list. For each node p any isomorphism algorithm, such as VF2 algorithm, is invoked, to find a subgraph that includes the node $p_i$ and matches the query semantic graph. In this process, nodes that the cursor $p_i$ points to are considered in turn, where i=1, . . . , $|V(Q_s)|$. A current threshold θ according to a newly found subgraph match is updated. In addition, for undiscovered subgraph matches, an upper bound Upperbound for matching scores of the undiscovered subgraph may be computed.

$$\text{Upbound} = \sum_{p_i} \log(\delta(\arg_i, p_i)) + \sum_{p_{ij}} \log\left(\delta\left(\overrightarrow{rel_{v_i v_j}}, P_{ij}\right)\right)$$

If θ>upperbound, it means that scores of all subgraph matches found will not exceed matching scores of subgraphs that have been discovered so far. In other words, the server already knows the top-k matches. Therefore, the server may terminate the running of the algorithm. Otherwise, the server moves all cursors one step forward in corresponding queues, and repeats the foregoing operation.

The top-k algorithm used by the server may be as follows:

---

Input: one query semantic graph $Q^s$ and one RDF graph G.
Output: Top-k query results, that is, top k most possible matching subgraphs of $Q^s$ over G.
 1: for each candidate list $L_{r_i}$, i = 1,......,$|E(Q^s)|$ do
 2:     Sorting all candidate relations in $L_{r_i}$ in a non-ascending order
 3: for each candidate list $L_{\arg_j}$, j = 1,......,$|V(Q^s)|$ do
 4:     Sorting all candidate entities/classes (i.e., vertices in G') in $L_{\arg_j}$ in a non-ascending order.
 5: Set cursor $c_i$ to the head of $L_{r_i}$ and cursor $c_j$ to the head of $L_{\arg_j}$, respectively.
 6: Set the upper bound Upbound(Q) according to Equation 3 and the threshold θ = −∞
 7: while true do
 8:     for each cursor $c_j$ in list $L_{\arg_j}$, j = 1,......,$|V(Q^s)|$ do
 9:         Perform an exploration based subgraph isomorphism algorithm from cursor $c_j$, such as VF2, to find subgraph matches (of $Q^s$ over G), which contains $c_j$.
 10:     Update the threshold θ to be the top-k match score so far.
 11:     Move all cursors $c_i$ and $c_j$ by one step forward in each list.
 12:     Update the upper bound Upbound(Q) according to Equation 3.
 13:     if θ ≥ Upbound(Q) then
 14:         Break // TA-style stopping strategy

---

Figure 3E:
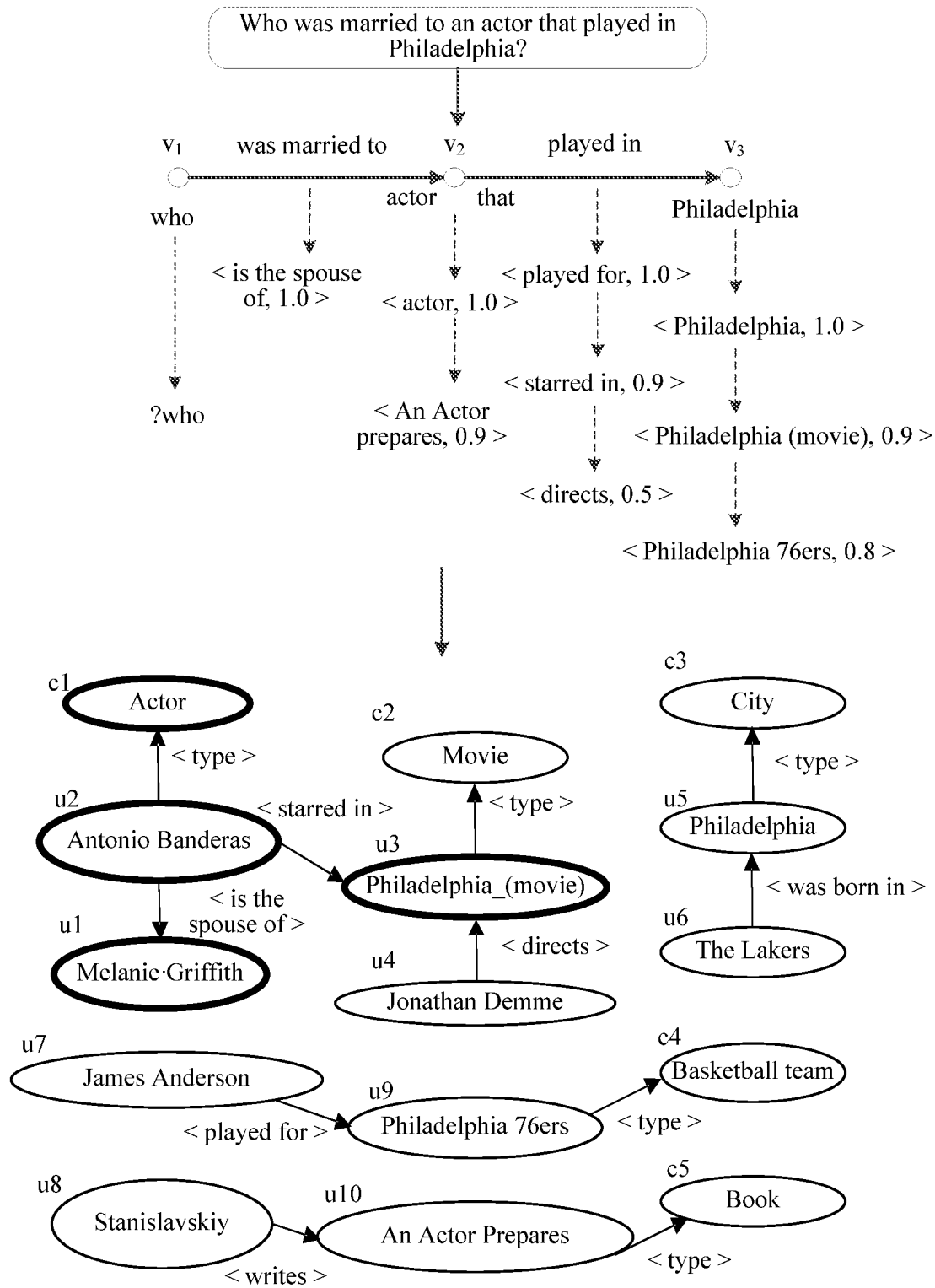

For example, in FIG. 3E, the server may discover, in the RDF graph G, that a subgraph including vertices $U_1$, $U_2$, $U_3$, and $C_1$ is a matching result of the query semantic graph $Q^s$. The vertex $v_3$ "Philadelphia" in the $Q^s$ is mapped to an entity $U_3$<Philadelphia>, the vertex $V_2$ "actor" is mapped to an entity $U_2$<Antonio Banderas>, where the class of the entity $U_2$<Antonio Banderas> is <actor>, the vertex $V_1$ "who" is mapped to an entity $U_1$<Melanie Griffith>; in addition, edges in $Q^s$ where the two relation phrases: "was married to" and "played in" are located are mapped to edges where the predicates <is the spouse of> and <starred in> are located, respectively.

Step 306: Obtain an answer to the natural language question N according to the subgraph.

Because the subgraph matches the query semantic graph $Q^s$, the subgraph includes the answer to the natural language question N.

Generally, the server obtains the answer to the natural language question N according to a node that is in the subgraph and corresponding to the interrogative in the query semantic graph $Q^s$.

Apparently, the entity $U_1$ <Melanie Griffith> is an answer to the natural language question N. It should be noted that, the server does not perform disambiguation in step 303 or step 304; however, if mapping from a vertex in the query semantic graph $Q^s$ to an entity is ambiguous, a matching subgraph that includes the ambiguous entity will not be discovered in the subgraph matching process. In other words, the discovered subgraph matching the query semantic graph $Q^s$ will not include the ambiguous entity. Therefore, a disambiguation process is naturally completed in the subgraph matching process, and the server does not need to perform disambiguation additionally.

As such, by converting a natural language question N into a query semantic graph $Q^s$, searching an RDF graph G for a subgraph matching the query semantic graph $Q^s$, and obtaining an answer to the natural language question N according to the subgraph, the natural language question answering method provided by this embodiment solves a problem of consumption of a large amount of computation for disambiguation in an understanding stage, and achieves an effect of providing a brand new natural language question answering mechanism in which disambiguation is not needed when the natural language question N is converted into the query semantic graph $Q^s$, and a disambiguation process is completed naturally in a process of searching for the subgraph matching the query semantic graph $Q^s$.

In the natural language question answering method provided by this embodiment, correlative parameters are further searched for by providing four heuristic rules, which improves the success rate of the correlative parameters, and improves the accuracy of understanding the natural language question N.

The natural language question answering method provided by this embodiment further provides two optimization methods to optimize a search space when the server performs subgraph matching, which improves the search efficiency of subgraph matching.

It should further be noted that, in the foregoing embodiment, the server further needs to construct a paraphrasing dictionary in advance.

In other words, before the server acquires the candidate list $C_{v_i v_j}$ of each relation phrase $rel_{v_i v_j}$ by using the preset paraphrasing dictionary, the method further includes:

1. Set a dictionary $T=\{rel_1, \ldots, rel_n\}$, where $i=1, \ldots, n$, and each $rel_i$ is one relation phrase, and map the relation phrase $rel_i$ to a predicate or predicate path L in the RDF graph G according to a supported entity set $Sup(rel_i)$ corresponding to each relation phrase $rel_i$.

The supported entity set of the relation phrase may be provided by existing Patty and ReVerb systems. These supported entity sets are existing research results extracted from many Neuro-Linguistic Programming (NLP) semantic relations.

The predicate path refers to a predicate edge consisting of at least two continuous simple paths. For example, if a predicate from A to B is "is the father of", and a predicate from B to C is "is the father or, a predicate edge consisting of" two simple paths from A to C represents a predicate "is the grandfather of". In the existing technology, during mining of mappings from relation phrases to predicates, only simple paths are considered, however, because many relation phrases cannot be explained as single predicates, this embodiment innovatively provides explaining complex predicates such as "is the grandfather of" and "is the uncle of" by using continuous predicate edges.

However, the inventor finds that a lot of noises are brought in during analysis of continuous predicates. In other words, for a complex predicate, many continuous predicate edges that are obtained through analysis and satisfy characteristics are different from the actual meaning of the complex predicate. Therefore, the inventor further provides a method of mining mappings from relation phrases to predicates by using tf–idf. The method is specifically as follows:

2. Compute a degree of confidence of the mapping from the relation phrase $rel_i$ to each predicate or predicate path L;

set, for each relation phrase $rel_i$, that the supported entity set corresponding to the relation phrase $rel_i$ is $Sup(rel_i)$:

$$Sup(rel_i)=\{(v_i^1,v_i^{'1}), \ldots ,(v_i^m,v_i^{'m})\},$$

find, in the RDF graph G for each entity pair $v_i^j$, $v_i^{'j}$ in the $Sup(rel_i)$, all simple paths between the entity pair $v_i^j$, $v_i^{'j}$, the simple paths being expressed as $P(v_i^j, v_i^{'j})$, and $$\text{make } PS(rel_i)=\cup_{j=1,\ldots,m} Path(v_i^j,v_i^{'j});$$

compute, for the predicate or predicate path L, a tf value of L in the $PS(rel_i)$ as follows:

$$tf(L,PS(rel_i))=|\{(Path(v_i^j,v_i^{'j})|L\in Path(v_i^j,v_i^{'j}))\}|;$$

compute an idf value of L in the dictionary $T=\{rel_1, \ldots, rel_n\}$ as follows:

$$idf(L, T) = \log\frac{|T|}{|\{rel_i \in T| L \in PS(rel_i)\}|+1};$$

compute a tf–idf value of L as follows:

$$tf\text{-}idf(L,PS(rel_i),T)=tf(L,PS(rel_i))\times idf(L,T); \text{ and}$$

use the tf–idf value as the degree of confidence of the mapping from the relation phrase $rel_i$ to the predicate or predicate path L.

3. Search, according to the degrees of confidence, continuous predicate edges formed in the RDF graph G by top k most possible predicate/predicate paths, the continuous predicate edges having same semantics as the relation phrase $rel_i$.

4. Construct the paraphrasing dictionary according to the relation phrase $rel_i$ and the continuous predicate edges.

An algorithm corresponding to this part is as follows:

Input: a relation phrase dictionary $T=\{rel_1, \ldots, rel_n\}$ and each text-form $rel_i$, where $i=1, \ldots, n$, a supported entity set $Sup(rel_i)=\{\{(v_i^1, v_i^{'1}), \ldots, (v_i^m, v_i^{'m})\}$, and an RDF graph G.

Output: top k most possible predicate/predicate paths $\{L_{i_1}, \ldots, L_{i_k}\}$ having same semantics as each relation phrase $rel_i$ ($i=1, \ldots, n$).

1: for each relation phrase $rel_i$, $i=1, \ldots, n$ in T do
2: for each entity pair $(v_i^j, v_i^{'j})$ in Sup(reli) do
3: Find all simple predicate path patterns (with length less than a predefined parameter θ) between $v_i^j$ and $v_i^{'j}$, denoted as $P(v_i^j, v_i^{'j})$.
4: $PS(t_i)=\cup_{j=1,\ldots,m} Path(v_i^j, v_i^{'j})$
5: for each relation phrase $rel_i$ do
6: for each predicate path pattern L in $PS(t_i)$ do
7: Compute tf–idf value of L
8: for relation phrase $rel_i$, record the k predicate path patterns with the top-k highest tf–idf values.

As such, the natural language question answering method provided by this embodiment not only describes complex relation phrases by using continuous predicate edges, but also provides a method of constructing a paraphrasing dictionary by using tf–idf, which effectively improves the efficiency and accuracy for acquiring a candidate list of a relation phrase.

QALD is the only test reference for an RDF-based question answering system. The inventor uses a QLAD-3 test set to test the foregoing natural language question answering method, and finds that the foregoing natural language question answering method can correctly answer 32 questions among a total of 99 questions in the test set, while the most advanced non-natural language question answering system, squall2sparq1, can answer 77 questions; however, the squall2sparq1 system is a non-natural language question answering system, and the user needs to specify the entity and predicate in the question; therefore, squall2sparq1 is incomparable to the natural language question answering system herein. The second most advanced system, casia, is a natural language question answering system, and can answer 30 questions among a total of 99 questions in the test set. Apparently, the natural language question answering system provided herein is advanced universally in terms of accuracy. Meanwhile, in terms of running time, the natural language question answering system also has an advantage which crosses the order of magnitudes compared with casia. For example, for the $81^{st}$ question in the QLAD-3 test set, it takes 418 seconds for casia to convert the natural language question into an SPARQLs query sentence, while it takes less than 1 second for the natural language question answering system herein to find out the answer to the $81^{st}$ question.

Figure 4:
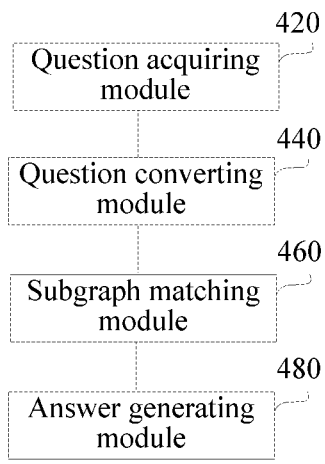
FIG. 4 is a schematic structural diagram of a natural language question answering apparatus according to an embodiment of the present invention.

Referring to FIG. 4, FIG. 4 shows a structural block diagram of a natural language question answering apparatus according to an embodiment of the present invention. The natural language question answering apparatus may be implemented as all or a part of a server by using software, hardware, or a combination thereof. The apparatus may include: a question acquiring module 420, a question converting module 440, a subgraph matching module 460, and an answer generating module 480.

The question acquiring module 420 is configured to acquire a natural language question N.

The question converting module 440 is configured to convert the natural language question N into a query semantic graph $Q^s$, each edge in the query semantic graph $Q^s$ representing one semantic relation in the natural language question N.

The subgraph matching module 460 is configured to search an RDF graph G for a subgraph matching the query semantic graph $Q^s$.

The answer generating module 480 is configured to obtain an answer to the natural language question N according to the subgraph.

As such, by converting a natural language question N into a query semantic graph $Q^s$, searching an RDF graph G for a subgraph matching the query semantic graph $Q^s$, and obtaining an answer to the natural language question N according to the subgraph, the natural language question answering apparatus provided by this embodiment solves a problem of consumption of a large amount of computation for disambiguation in an understanding stage, and achieves an effect of providing a brand new natural language question answering mechanism in which disambiguation is not needed when the natural language question N is converted into the query semantic graph $Q^s$, and a disambiguation process is completed naturally in a process of searching for the subgraph matching the query semantic graph $Q^s$.

Figure 5:
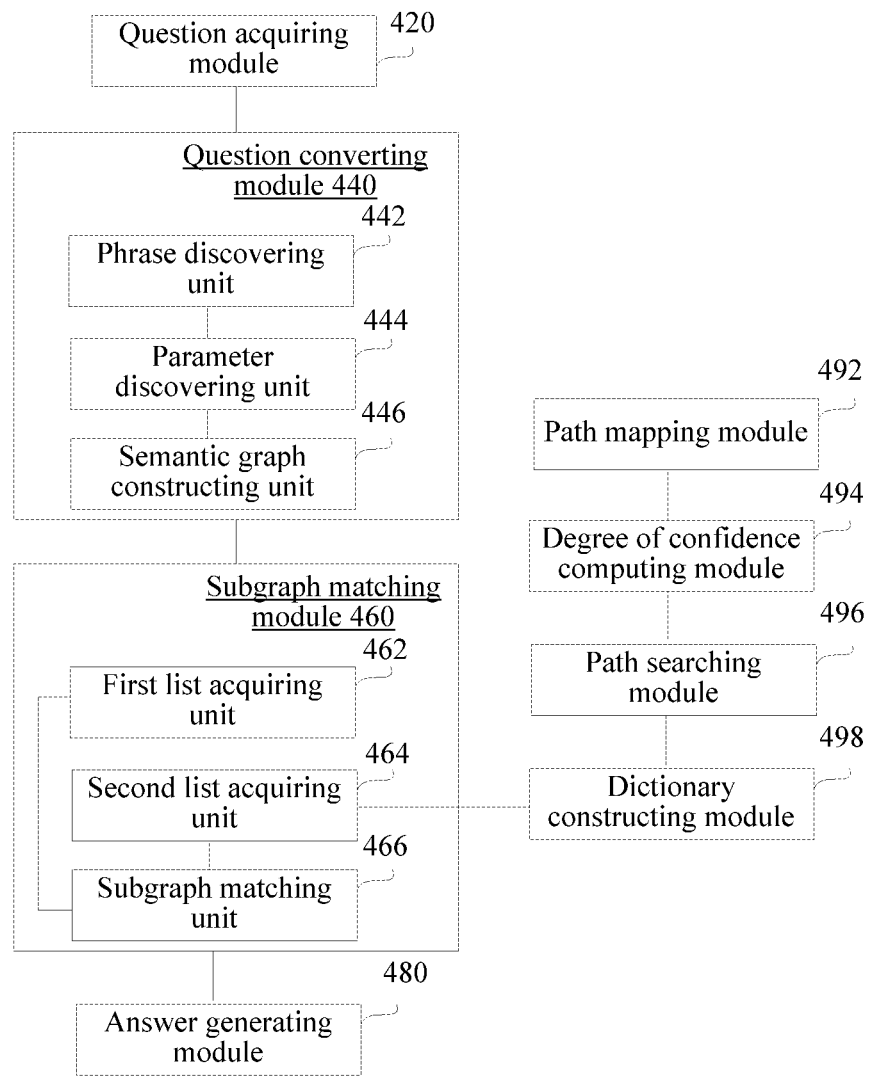
FIG. 5 is a schematic structural diagram of a natural language question answering apparatus according to another embodiment of the present invention.

Referring to FIG. 5, FIG. 5 shows a schematic structural diagram of a natural language question answering apparatus according to another embodiment of the present invention. The natural language question answering apparatus may be implemented as all or a part of a server by using software, hardware, or a combination thereof. The apparatus may include: a question acquiring module 420, a question converting module 440, a subgraph matching module 460, and an answer generating module 480. The modules 420, 440, 460, and 480 exist in a memory (a memory 602 as shown in FIG. 7) of the server, and are executed by one or more built-in processors (a central processing unit 601 as shown in FIG. 7) of the server, so as to implement the natural language question answering method.

The question acquiring module 420 is configured to acquire a natural language question N.

The question converting module 440 is configured to convert the natural language question N into a query semantic graph $Q^s$, each edge in the query semantic graph $Q^s$ representing one semantic relation in the natural language question N.

The subgraph matching module 460 is configured to search an RDF graph G for a subgraph matching the query semantic graph $Q^s$.

The answer generating module 480 is configured to obtain an answer to the natural language question N according to the subgraph.

The question converting module 440 includes a phrase discovering unit 442, a parameter discovering unit 444, and a semantic graph constructing unit 446.

The phrase discovering unit 442 is configured to discover a relation phrase in the natural language question N.

The parameter discovering unit 444 is configured to discover correlative parameters of each relation phrase.

The semantic graph constructing unit 446 is configured to construct the query semantic graph $Q^s$, each edge in the query semantic graph $Q^s$ corresponding to one relation phrase, and each vertex in the query semantic graph $Q^s$ corresponding to one correlative parameter.

The phrase discovering unit 442 includes:

a syntax analyzing sub-unit, configured to analyze the natural language question to obtain a syntax dependence tree Y; and a phrase query sub-unit, configured to look up, according to a preset relation phrase dictionary, the relation phrase dictionary for a relation phrase that exists in the syntax dependence tree Y, where, when a relation phrase in the relation phrase dictionary exists in the syntax dependence tree Y, one and only one connected subtree y in the syntax dependence tree Y satisfies the following conditions:

condition 1: each node in the connected subtree y comprises one word of the relation phrase, and the connected subtree y includes all words of the relation phrase; and condition 2: it is impossible to find a subtree y' in the syntax dependence tree Y, the subtree y' also satisfying the condition 1 and the connected subtree y being a subtree of the subtree y'.

The parameter discovering unit 444 is configured to discover, in the connected subtree y that corresponds to each relation phrase and is in the syntax dependence tree Y, correlative parameters of the relation phrase according to a subject-class semantic relation and an object-class semantic relation.

The subject-class semantic relation includes: subject, nominal subject, passive nominal subject, clause subject, passive clause subject, control subject, and possessive modifier.

The object-class semantic relation includes: object, prepositional object, direct object, and indirect object.

The subgraph matching module 460 includes:

a first list acquiring unit 462, configured to acquire a candidate list $C_{v_i}$ corresponding to each correlative parameter on the assumption that the query semantic graph $Q^s$ includes n vertices $\{v_1, \ldots, v_n\}$, and each vertex $v_i$ in the query semantic graph $Q^s$ corresponds to one correlative parameter, wherein $i=1, \ldots, n$;

a second list acquiring unit 464, configured to acquire a candidate list $C_{v_iv_j}$ corresponding to each relation phrase $rel_{v_iv_j}$, each edge $v_iv_j$ in the query semantic graph $Q^s$ corresponding to one relation phrase $rel_{v_iv_j}$, wherein $1 \leq i \neq j \leq n$; and a subgraph matching unit 466, configured to search the RDF graph G for a subgraph matching the query semantic graph $Q^s$ according to the candidate list $C_{v_i}$ and the candidate list $C_{v_iv_j}$.

The first list acquiring unit 462 is configured to acquire the candidate list $C_{v_i}$ corresponding to each correlative parameter $arg_i$ by using an entity linking technology, the candidate list $C_{v_i}$ corresponding to each correlative parameter $arg_i$ including a mapping from the correlative parameter $arg_i$ to at least one candidate entity or candidate class in the RDF graph G, each mapping corresponding to a degree of confidence, and mappings in each candidate list $C_{v_i}$ being sorted according to a descending order of degrees of confidence.

The second list acquiring unit 464 is configured to acquire the candidate list C corresponding to each relation phrase $rel_{v_iv_j}$ by using a preset paraphrasing dictionary, the candidate list $C_{v_iv_j}$ of each relation phrase $rel_{v_iv_j}$ including a mapping from the relation phrase $rel_{v_iv_j}$ to at least one candidate predicate or candidate predicate path in the RDF graph G, each mapping corresponding to a degree of confidence, and mappings in each candidate list $C_{v_iv_j}$ being sorted according to a descending order of degrees of confidence.

The subgraph matching unit 466 is configured to search the RDF graph G for a subgraph that includes vertices $\{u_1, \ldots, u_n\}$ and satisfies a preset condition, the preset condition including the following three conditions:

condition 1: if $v_i$ is mapped to an entity $u_i$ in the RDF graph G, where $i=1, \ldots, n$, $u_i$ should belong to the candidate list $C_{v_i}$;

condition 2: if $v_i$ is mapped to a class $c_i$ in the RDF graph G, where $i=1, \ldots, n$, $u_i$ is an entity whose class is $c_i$, and $c_i$ should belong to the candidate list $C_{v_i}$; and condition 3: for each edge $v_iv_j \in Q^s$, $u_iu_j \in G$ or $u_ju_i \in G$, and a predicate or predicate path $P_{ij}$ corresponding to the edge $v_iv_j$ is mapped to $u_iu_j$ or $u_ju_i$ in the candidate list $V_{v_iv_j}$.

The apparatus further includes:

a path mapping module 492, configured to set a dictionary $T=\{rel_1, \ldots, rel_n\}$, where $i=1, \ldots, n$, and each $rel_i$ is one relation phrase, and map the relation phrase $rel_i$ to a predicate or predicate path L in the RDF graph G according to a supported entity set $Sup(rel_i)$ corresponding to each relation phrase $rel_i$;

a degree of confidence computing module 494, configured to compute a degree of confidence of the mapping from the relation phrase $rel_i$ to each predicate or predicate path L;

a path searching module 496, configured to search, according to the degrees of confidence, continuous predicate edges formed in the RDF graph G by top k most possible predicate/predicate paths, the continuous predicate edges having same semantics as the relation phrase $rel_i$; and a dictionary constructing module 498, configured to construct the paraphrasing dictionary according to the relation phrase $rel_i$ and the continuous predicate edges.

The degree of confidence computing module 494 includes:

a path searching unit, configured to set, for each relation phrase $rel_i$, that the supported entity set corresponding to the relation phrase $rel_i$ is $Sup(rel_i)$:

$$Sup(rel_i)=\{(v_i^1,v_i'^1), \ldots ,(v_i^m,v_i'^m)\},$$

find, in the RDF graph G for each entity pair $v_i^j$, $v_i'^j$ in the $Sup(rel_i)$, all simple paths between the entity pair $v_i^j$, $v_i'^j$, the simple paths being expressed as $P(v_i^j, v_i'^j)$, and $$\text{make } PS(rel_i)=\cup_{j=1,\ldots,m}Path(v_i^j,v_i'^j);$$

a tf value computing unit, configured to compute, for the predicate or predicate path L, a tf value of L in the $PS(rel_i)$ as follows:

$$tf(L,PS(rel_i))=|\{(Path(v_i^j,v_i'^j)|L \in Path(v_i^j,v_i'^j))\}|$$

an idf value computing unit, configured to compute an idf value of L in the dictionary $T=\{rel_1, \ldots, rel_n\}$ as follows:

$$idf(L,T) = \log\frac{|T|}{|\{rel_i \in T | L \in PS(rel_i)\}|+1};$$

and a Tf–idf value computing unit, configured to compute a tf–idf value of L as follows:

$$tf\text{-}idf(L,PS(rel_i),T)=tf(L,PS(rel_i)) \times idf(L,T); \text{ and}$$

use the tf–idf value as the degree of confidence of the mapping from the relation phrase $rel_i$ to the predicate or predicate path L.

It should be noted that: when the server provided by the foregoing embodiment performs natural language question answering, the foregoing division of functional modules is merely used as an example for description purposes; in an actual application, the foregoing functions may be completed by different functional modules, so as to complete all or some functions described above. In addition, the natural language question answering apparatus provided by the foregoing embodiment belongs to a same conception as the embodiment of the natural language question answering method; for the specific implementation process, refer to the method embodiment, and details are not described herein again.

Figure 6:
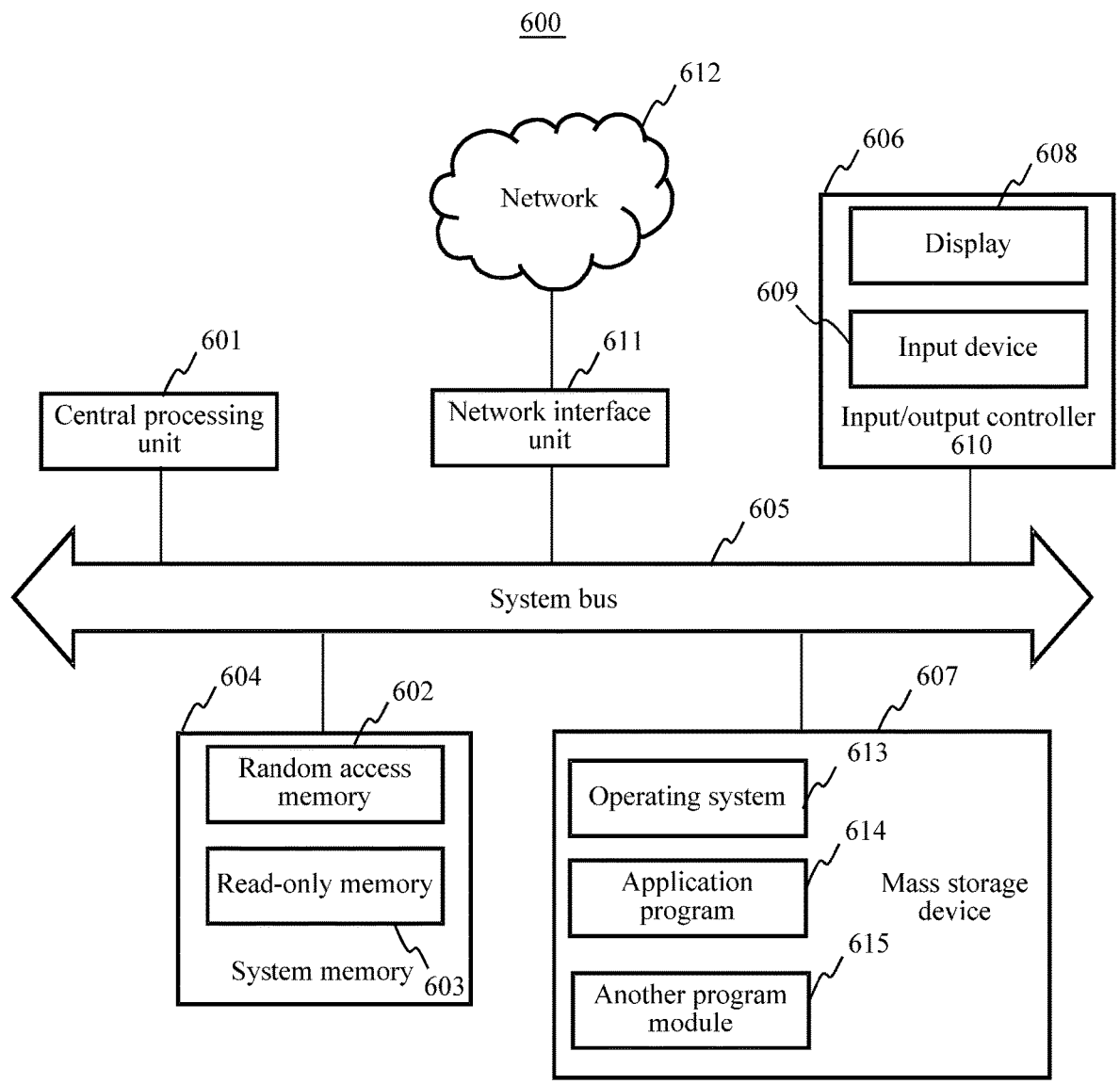
FIG. 6 is a schematic structural diagram of a server according to an embodiment of the present invention.

Referring to FIG. 6, FIG. 6 shows a structural block diagram of a server provided by an embodiment of the present invention. The server 600 includes a central processing unit (CPU) 601, a system memory 604 that includes a random access memory (RAM) 602 and read-only memory (ROM) 603, and a system bus 605 connecting the system memory 604 and the CPU 605. The server 600 further includes a basic input/output (I/O) system 606 that facilitates information transmission between components in the computer, and a mass storage device 607 configured to store an operating system 613, an application program 614, and another program module 615.

The basic I/O system 606 includes a display 608 configured to display information, and an input device 609, such as a mouse and a keyboard, used by a user to input information. The display 608 and the input device 609 are both connected to the CPU 601 through an I/O controller 610 that is connected to the system bus 605. The basic I/O system 606 may further include the I/O controller 610 to receive and process input from multiple other devices such as a keyboard, a mouse, and an electronic stylus. Similarly, the I/O controller 610 further provides output to a display, a printer, or other types of output devices.

The mass storage device 607 is connected to the CPU 601 through a mass storage controller (not shown) that is connected to the system bus 605. The mass storage device 607 and a related non-transitory computer readable medium thereof provide non-volatile storage for a function server or a verification server 600. In other words, the mass storage device 607 may include a computer readable medium (not shown) such as a hard disk or a CD-ROM drive.

Generally, the computer-readable medium may include a computer storage medium and a communication medium. The computer storage medium includes volatile and non-volatile, removable and non-removable media implemented in any method or technology for storing information such as computer-readable instructions, data structures, program modules, or other data. The computer storage medium includes a RAM, a ROM, an electrically erasable programmable read-only memory (EEPROM), a flash memory or other solid-state storage technologies, a CD-ROM, a digital versatile disk (DVD) or other optical storage, a magnetic cassette, a magnetic tape, magnetic disk storage or other magnetic storage devices. Certainly, a person skilled in the art may know that the computer storage medium is not limited to those described above. The foregoing system memory 604 and the mass storage device 607 may be generally referred to as a memory.

According to the embodiments of the present invention, the server 600 may further be connected to a remote computer through a network such as the Internet and run on the remote computer. In other words, the server 600 may be connected to a network 612 through a network interface unit 611 on the system bus 605, or, may be connected to other types of network or remote computer systems (not shown) by using the network interface unit 611.

The memory further includes one or more programs, where the one or more programs are stored in the memory, and the one or more programs include instructions for performing the natural language question answering method provided by the embodiment of the present invention.

The sequence numbers of the foregoing embodiments of the present invention are merely for the convenience of description, and do not imply the preference among the embodiments.

A person of ordinary skill in the art may understand that all or some of the steps of the foregoing embodiments may be implemented by using hardware, or may be implemented by a program instructing relevant hardware. The program may be stored in a computer readable storage medium. The storage medium may be a read-only memory, a magnetic disk, an optical disc, or the like.

The foregoing descriptions are merely preferred embodiments of the present invention, but are not intended to limit the present invention. Any modification, equivalent replacement, or improvement made within the spirit and principle of the present invention shall fall within the protection scope of the present invention.

What is claimed is:

1. A natural language question answering method, applied to a server, the server comprising one or more processors, a memory, and program instructions stored in the memory, and the program instructions being executed by the one or more processors; the method comprising:
    acquiring a natural language question N;
    determining a relation phrase in the natural language question N;
    determining correlative parameters of each relation phrase of the natural language question N;
    constructing a query semantic graph $Q^s$, each edge in the query semantic graph $Q^s$ corresponding to one relation phrase and representing one semantic relation in the natural language question N, and each vertex in the query semantic graph $Q^s$ corresponding to one correlative parameter, wherein at least one vertex in the query semantic graph $Q^s$ correspond to multiple entities, the multiple entities representing multiple interpretations of a same term in the natural language question N;
    acquiring a candidate list $C_{v_i}$ corresponding to each correlative parameter on the assumption that the query semantic graph $Q^s$ comprises n vertices $\{v_1, \ldots, v_n\}$, and each vertex $v_i$ in the query semantic graph $Q^s$ corresponds to one correlative parameter, wherein $i=1, \ldots, n$;
    acquiring a candidate list $C_{v_iv_j}$ corresponding to each relation phrase $rel_{v_iv_j}$ by using a preset paraphrasing dictionary, each edge $v_iv_j$ in the query semantic graph Qs corresponding to one relation phrase $rel_{v_iv_j}$, the candidate list $C_{v_iv_j}$ of each relation phrase $rel_{v_iv_j}$ comprising a mapping from the relation phrase $rel_{v_iv_j}$ to at least one candidate predicate or candidate predicate path in the RDF graph G, each mapping corresponding to a degree of confidence, and mappings in each candidate list $C_{v_iv_j}$ being sorted according to a descending order of degrees of confidence, wherein $1 \leq i \neq j \leq n$;
    searching the RDF graph G for a subgraph matching the query semantic graph Qs according to the candidate list $C_{v_i}$ and the candidate list $C_{v_iv_j}$; and
    obtaining an answer to the natural language question N according to the subgraph.

2. The method according to claim 1, wherein the acquiring the candidate list $C_{v_i}$ corresponding to each correlative parameter comprises:
    acquiring the candidate list $C_{v_i}$ corresponding to each correlative parameter $arg_i$ by using an entity linking technology, the candidate list $C_{v_i}$ corresponding to each correlative parameter $arg_i$ comprising a mapping from the correlative parameter $arg_i$ to at least one candidate entity or candidate class in the RDF graph G, each mapping corresponding to a degree of confidence, and mappings in each candidate list $C_{v_i}$ being sorted according to a descending order of degrees of confidence.

3. The method according to claim 1, wherein the searching the RDF graph G for a subgraph matching the query semantic graph $Q^s$ according to the candidate list $C_{v_i}$ and the candidate list $C_{v_iv_j}$ comprises:
    searching the RDF graph G for a subgraph that comprises vertices $\{u_1, \ldots, u_n\}$ and satisfies a preset condition, the preset condition comprising the following three conditions:
    condition 1: if $v_i$ is mapped to an entity $u_i$ in the RDF graph G, wherein $i=1, \ldots, n$, $u_i$ should belong to the candidate list $C_{v_i}$;
    condition 2: if $v_i$ is mapped to a class $c_i$ in the RDF graph G, wherein $i=1, \ldots, n$, $u_i$ is an entity whose class is $c_i$, and $c_i$ should belong to the candidate list $C_{v_i}$; and
    condition 3: for each edge $v_iv_j \in Q^s$, $u_iu_j \in G$ or $u_ju_i \in G$, and a predicate or predicate path $P_{ij}$ corresponding to the edge $v_iv_j$ is mapped to $u_iu_j$ or $u_ju_i$ in the candidate list $C_{v_iv_j}$.

4. The method according to claim 1, wherein the determining a relation phrase in the natural language question N comprises:
    analyzing the natural language question to obtain a syntax dependence tree Y;
    looking up, according to a preset relation phrase dictionary, the relation phrase dictionary for a relation phrase that exists in the syntax dependence tree Y, wherein, when a relation phrase in the relation phrase dictionary exists in the syntax dependence tree Y, one and only one connected subtree y in the syntax dependence tree Y satisfies the following conditions:
    condition 1: each node in the connected subtree y comprises one word of the relation phrase, and the connected subtree y comprises all words of the relation phrase; and
    condition 2: it is impossible to find a subtree y' in the syntax dependence tree Y, the subtree y' also satisfying the condition 1 and the connected subtree y being a subtree of the subtree y'.

5. The method according to claim 4, wherein the determining correlative parameters of each relation phrase comprises:
    discovering, in the connected subtree y that is corresponding to each relation phrase and is in the syntax dependence tree Y, correlative parameters of the relation phrase according to a subject-class semantic relation and an object-class semantic relation;

the subject-class semantic relation comprising: subject, nominal subject, passive nominal subject, clause subject, passive clause subject, control subject, and possessive modifier; and the object-class semantic relation comprising: object, prepositional object, direct object, and indirect object.

6. The method according to claim 1, before the acquiring the candidate list $C_{v_iv_j}$ corresponding to each relation phrase $rel_{v_iv_j}$ by using a preset paraphrasing dictionary, further comprising:

setting a dictionary T={$rel_1$, . . . , $rel_n$}, wherein i=1, . . . , n, and each $rel_i$ is one relation phrase, and mapping the relation phrase $rel_i$ to a predicate or predicate path L in the RDF graph G according to a supported entity set Sup($rel_i$) corresponding to each relation phrase $rel_i$;

computing a degree of confidence of the mapping from the relation phrase $rel_i$ to each predicate or predicate path L;

searching, according to the degrees of confidence, continuous predicate edges formed in the RDF graph G by top k most possible predicate/predicate paths, the continuous predicate edges having same semantics as the relation phrase $rel_i$; and constructing the paraphrasing dictionary according to the relation phrase $rel_i$ and the continuous predicate edges.

7. The method according to claim 6, wherein the computing a degree of confidence of the mapping from the relation phrase $rel_i$ to each predicate or predicate path L comprises:

setting, for each relation phrase $rel_i$, that the supported entity set corresponding to the relation phrase $rel_i$ is Sup($rel_i$):

$$Sup(rel_i)=\{(v_i^1,v_i'^1), \ldots ,(v_i^m,v_i'^m)\},$$

finding, in the RDF graph G for each entity pair $v_i^j$, $v_i'^j$ in the Sup($rel_i$), all simple paths between the entity pair $v_i^j$, $v_i'^j$, the simple paths being expressed as P($v_i^j$, $v_i'^j$), and $$making\ PS(rel_i)=\cup_{j=1,\ldots,m}Path(v_i^j,v_i'^j);$$

computing, for the predicate or predicate path L, a tf value of L in the PS ($rel_i$) as follows:

$$tf(L,PS(rel_i))=|\{(Path(v_i^j,v_i'^j)|L\in Path(v_i^j,v_i'^j))\}|;$$

computing an idf value of L in the dictionary T={$rel_1$, . . . , $rel_n$} as follows:

$$idf(L, T) = \log\frac{|T|}{|\{rel_i \in T \mid L \in PS(rel_i)\}| + 1};$$

computing a tf-idf value of L as follows:

$$tf\text{-}idf(L,PS(rel_i),T)=tf(L,PS(rel_i))\times idf(L,T);\ and$$

using the tf-idf value as the degree of confidence of the mapping from the relation phrase reli to the predicate or predicate path L.

8. A server, comprising:
a processor;
a memory coupled to the processor, wherein the processor is configured to:

acquire a natural language question N;
determine a relation phrase in the natural language question N;
determine correlative parameters of each relation phrase of the natural language question N;
construct a query semantic graph $Q^s$, each edge in the query semantic graph $Q^s$ corresponding to one relation phrase and representing one semantic relation in the natural language question N, and each vertex in the query semantic graph $Q^s$ corresponding to one correlative parameter, wherein at least one vertex in the query semantic graph $Q^s$ correspond to multiple entities, the multiple entities representing multiple interpretations of a same term in the natural language question N;
acquire a candidate list $C_{v_i}$ corresponding to each correlative parameter on the assumption that the query semantic graph $Q^s$ comprises n vertices {$v_1, \ldots, v_n$}, and each vertex $v_i$ in the query semantic graph $Q^s$ corresponds to one correlative parameter, wherein i=1, . . . , n;
acquire a candidate list $C_{v_iv_j}$ corresponding to each relation phrase $rel_{v_iv_j}$, by using a preset paraphrasing dictionary, each edge $v_iv_j$ in the query semantic graph Qs corresponding to one relation phrase $rel_{v_iv_j}$, the candidate list $C_{v_iv_j}$ of each relation phrase $rel_{v_iv_j}$ comprising a mapping from the relation phrase $rel_{v_iv_j}$ to at least one candidate predicate or candidate predicate path in the RDF graph G, each mapping corresponding to a degree of confidence, and mappings in each candidate list $C_{v_iv_j}$ being sorted according to a descending order of degrees of confidence, wherein 1≤i≠j≤n;
search the RDF graph G for a subgraph matching the query semantic graph Qs according to the candidate list $C_{v_i}$ and the candidate list $C_{v_iv_j}$; and
obtain an answer to the natural language question N according to the subgraph.

9. The server according to claim 8, wherein the processor is further configured to:
acquire the candidate list $C_{v_i}$ corresponding to each correlative parameter $arg_i$ by using an entity linking technology, the candidate list $C_{v_i}$ corresponding to each correlative parameter $arg_i$ comprising a mapping from the correlative parameter $arg_i$ to at least one candidate entity or candidate class in the RDF graph G, each mapping corresponding to a degree of confidence, and mappings in each candidate list $C_{v_i}$ being sorted according to a descending order of degrees of confidence.

10. The server according to claim 8, wherein the processor is further configured to:
search the RDF graph G for a subgraph that comprises vertices {$u_1, \ldots, u_n$} and satisfies a preset condition, the preset condition comprising the following three conditions:
condition 1: if $v_i$ is mapped to an entity $u_i$ in the RDF graph G, wherein i=1, . . . , n, $u_i$ should belong to the candidate list $C_{v_i}$;
condition 2: if $v_i$ is mapped to a class $c_i$ in the RDF graph G, wherein i=1, . . . , n, $u_i$ is an entity whose class is $c_i$, and $c_i$ should belong to the candidate list $C_{v_i}$; and
condition 3: for each edge $v_iv_j \in Q^s$, $u_iu_j \in G$ or $u_ju_i \in G$, and a predicate or predicate path $P_{ij}$ corresponding to the edge $v_iv_j$ is mapped to $u_iu_j$ or $u_ju_i$ in the candidate list $C_{v_iv_j}$.

11. The server according to claim 8, wherein the processor is further configured to:
analyze the natural language question to obtain a syntax dependence tree Y;

look up, according to a preset relation phrase dictionary, the relation phrase dictionary for a relation phrase that exists in the syntax dependence tree Y, wherein, when a relation phrase in the relation phrase dictionary exists in the syntax dependence tree Y, one and only one connected subtree y in the syntax dependence tree Y satisfies the following conditions:

condition 1: each node in the connected subtree y comprises one word of the relation phrase, and the connected subtree y comprises all words of the relation phrase; and condition 2: it is impossible to find a subtree y' in the syntax dependence tree Y, the subtree y' also satisfying the condition 1 and the connected subtree y being a subtree of the subtree y'.

12. The server according to claim 11, wherein the processor is further configured to:

discover, in the connected subtree y that is corresponding to each relation phrase and is in the syntax dependence tree Y, correlative parameters of the relation phrase according to a subject-class semantic relation and an object-class semantic relation;

the subject-class semantic relation comprising: subject, nominal subject, passive nominal subject, clause subject, passive clause subject, control subject, and possessive modifier; and the object-class semantic relation comprising: object, prepositional object, direct object, and indirect object.

13. The server according to claim 8, wherein the processor is further configured to:

set a dictionary T={$rel_i$, ..., $rel_n$}, wherein i=1, ..., n, and each $rel_i$ is one relation phrase, and mapping the relation phrase $rel_i$ to a predicate or predicate path L in the RDF graph G according to a supported entity set Sup($rel_i$) corresponding to each relation phrase $rel_i$;

compute a degree of confidence of the mapping from the relation phrase $rel_i$ to each predicate or predicate path L;

search, according to the degrees of confidence, continuous predicate edges formed in the RDF graph G by top k most possible predicate/predicate paths, the continuous predicate edges having same semantics as the relation phrase $rel_i$; and construct the paraphrasing dictionary according to the relation phrase $rel_i$ and the continuous predicate edges.

14. The server according to claim 13, wherein the processor is further configured to:

set, for each relation phrase $rel_i$, that the supported entity set corresponding to the relation phrase $rel_i$ is Sup($rel_i$):

$$Sup(rel_i)=\{\{(v_i^1,v_i'^1), ..., (v_i^m,v_i'^m)\}\},$$

find, in the RDF graph G for each entity pair $v_i^j$, $v_i'^j$ in the Sup($rel_i$), all simple paths between the entity pair $v_i^j$, $v_i'^j$, the simple paths being expressed as P($v_i^j$, $v_i'^j$), and $$making\ PS(rel_i)=\cup_{j=1,...,m}Path(v_i^j,v_i'^j);$$

compute, for the predicate or predicate path L, a tf value of L in the PS($rel_i$) as follows:

$$tf(L,PS(rel_i))=|\{(Path(v_i^j,v_i'^j)|L\in Path(v_i^j,v_i'^j))\}|;$$

compute an idf value of L in the dictionary T={$rel_1$, ..., $rel_n$} as follows:

$$idf(L, T) = \log\frac{|T|}{|\{rel_i \in T\ |\ L \in PS(rel_i)\}| + 1};$$

compute a tf-idf value of L as follows:

$$tf\text{-}idf(L,PS(rel_i),T)=tf(L,PS(rel_i))\times idf(L,T);\ and$$

use the tf-idf value as the degree of confidence of the mapping from the relation phrase reli to the predicate or predicate path L.

15. A non-transitory computer readable medium storing executable computer program instructions for natural language question answering, the computer program instructions comprising instructions for:

acquiring a natural language question N;

determining a relation phrase in the natural language question N;

determining correlative parameters of each relation phrase of the natural language question N;

constructing a query semantic graph $Q^s$, each edge in the query semantic graph $Q^s$ corresponding to one relation phrase and representing one semantic relation in the natural language question N, and each vertex in the query semantic graph $Q^s$ corresponding to one correlative parameter, wherein at least one vertex in the query semantic graph $Q^s$ correspond to multiple entities, the multiple entities representing multiple interpretations of a same term in the natural language question N;

acquiring a candidate list $C_{v_i}$ corresponding to each correlative parameter on the assumption that the query semantic graph $Q^s$ comprises n vertices $\{v_1, ..., v_n\}$, and each vertex $v_i$ in the query semantic graph $Q^s$ corresponds to one correlative parameter, wherein i=1, ..., n;

acquiring a candidate list $C_{v_iv_j}$ corresponding to each relation phrase $rel_{v_iv_j}$, by using a preset paraphrasing dictionary, each edge $v_iv_j$ in the query semantic graph Qs corresponding to one relation phrase $rel_{v_iv_j}$, the candidate list $C_{v_iv_j}$ of each relation phrase $rel_{v_iv_j}$ comprising a mapping from the relation phrase $rel_{v_iv_j}$ to at least one candidate predicate or candidate predicate path in the RDF graph G, each mapping corresponding to a degree of confidence, and mappings in each candidate list $C_{v_iv_j}$ being sorted according to a descending order of degrees of confidence, wherein $1\le i\ne j\le n$;

searching the RDF graph G for a subgraph matching the query semantic graph Qs according to the candidate list $C_{v_i}$ and the candidate list $C_{v_iv_j}$; and obtaining an answer to the natural language question N according to the subgraph.

16. The non-transitory computer readable medium according to claim 15, wherein the acquiring the candidate list $C_{v_i}$ corresponding to each correlative parameter comprises:

acquiring the candidate list $C_{v_i}$ corresponding to each correlative parameter $arg_i$ by using an entity linking technology, the candidate list $C_{v_i}$ corresponding to each correlative parameter $arg_i$ comprising a mapping from the correlative parameter $arg_i$ to at least one candidate entity or candidate class in the RDF graph G, each mapping corresponding to a degree of confidence, and mappings in each candidate list $C_{v_i}$ being sorted according to a descending order of degrees of confidence.

17. The non-transitory computer readable medium according to claim 15, wherein the searching the RDF graph G for a subgraph matching the query semantic graph $Q^s$ according to the candidate list $C_{v_i}$ and the candidate list $C_{v_iv_j}$ comprises:

searching the RDF graph G for a subgraph that comprises vertices $\{u_1, \ldots, u_n\}$ and satisfies a preset condition, the preset condition comprising the following three conditions:

condition 1: if $v_i$ is mapped to an entity $u_i$ in the RDF graph G, wherein $i=1, \ldots, n$, $u_i$ should belong to the candidate list $C_{v_i}$;

condition 2: if $v_i$ is mapped to a class $c_i$ in the RDF graph G, wherein $i=1, \ldots, n$, $u_i$ is an entity whose class is $c_i$, and $c_i$ should belong to the candidate list $C_{v_i}$; and condition 3: for each edge $v_iv_j \in Q^s$, $u_iu_j \in G$ or $u_ju_i \in G$, and a predicate or predicate path $P_{ij}$ corresponding to the edge $v_iv_j$ is mapped to $u_iu_j$ or $u_ju_i$ in the candidate list $C_{v_iv_j}$.

18. The non-transitory computer readable medium according to claim 15, wherein the determining a relation phrase in the natural language question N comprises:

analyzing the natural language question to obtain a syntax dependence tree Y;

looking up, according to a preset relation phrase dictionary, the relation phrase dictionary for a relation phrase that exists in the syntax dependence tree Y, wherein, when a relation phrase in the relation phrase dictionary exists in the syntax dependence tree Y, one and only one connected subtree y in the syntax dependence tree Y satisfies the following conditions:

condition 1: each node in the connected subtree y comprises one word of the relation phrase, and the connected subtree y comprises all words of the relation phrase; and condition 2: it is impossible to find a subtree y' in the syntax dependence tree Y, the subtree y' also satisfying the condition 1 and the connected subtree y being a subtree of the subtree y'.

19. The non-transitory computer readable medium according to claim 18, wherein the determining correlative parameters of each relation phrase comprises:

discovering, in the connected subtree y that is corresponding to each relation phrase and is in the syntax dependence tree Y, correlative parameters of the relation phrase according to a subject-class semantic relation and an object-class semantic relation;

the subject-class semantic relation comprising: subject, nominal subject, passive nominal subject, clause subject, passive clause subject, control subject, and possessive modifier; and the object-class semantic relation comprising: object, prepositional object, direct object, and indirect object.

20. The non-transitory computer readable medium according to claim 15, wherein the computer program instructions further comprise instructions for: before the acquiring the candidate list $C_{v_iv_j}$ corresponding to each relation phrase $rel_{v_iv_j}$ by using a preset paraphrasing dictionary:

setting a dictionary $T=\{rel_1, \ldots, rel_n\}$, wherein $i=1, \ldots, n$, and each $rel_i$ is one relation phrase, and mapping the relation phrase $rel_i$ to a predicate or predicate path L in the RDF graph G according to a supported entity set $Sup(rel_i)$ corresponding to each relation phrase $rel_i$;

computing a degree of confidence of the mapping from the relation phrase $rel_i$ to each predicate or predicate path L;

searching, according to the degrees of confidence, continuous predicate edges formed in the RDF graph G by top k most possible predicate/predicate paths, the continuous predicate edges having same semantics as the relation phrase $rel_i$; and constructing the paraphrasing dictionary according to the relation phrase $rel_i$ and the continuous predicate edges.

* * * * *